United States Patent [19]
Cotton et al.

[11] Patent Number: 5,623,907
[45] Date of Patent: Apr. 29, 1997

[54] LIQUID PROPANE FUEL DELIVERY SYSTEM

[75] Inventors: Kenneth J. Cotton, Caro; James A. Herndon, Cass City; Ronald H. Roche, Cass City; John S. Stark, Cass City; Matthew L. Werner, Caro, all of Mich.

[73] Assignee: Walbro Corporation, Cass City, Mich.

[21] Appl. No.: 488,813

[22] Filed: Jun. 9, 1995

[51] Int. Cl.$^6$ ............ F02M 37/04; F02M 21/02; F02N 17/00
[52] U.S. Cl. ............ 123/456; 123/497; 123/514; 123/525; 123/179.17
[58] Field of Search ............ 123/495, 497, 123/514, 456, 525, 179.16, 179.17

[56] References Cited

U.S. PATENT DOCUMENTS

| | | | |
|---|---|---|---|
| 5,033,444 | 7/1991 | Kaufman et al. | 123/527 |
| 5,275,145 | 1/1994 | Tuckey | 123/525 |
| 5,373,829 | 12/1994 | Schuers et al. | 123/514 |
| 5,377,645 | 1/1995 | Moore | 123/514 |
| 5,479,906 | 1/1996 | Collie | 123/525 |

*Primary Examiner*—Thomas N. Moulis
*Attorney, Agent, or Firm*—Barnes, Kisselle, Raisch, Choate, Whittemore & Hulbert

[57] ABSTRACT

A liquid propane fuel storage and delivery system for a vehicle engine with a fluid handling component module removably top-mounted on an appropriate vehicle-mounted pressurized liquid propane fuel storage tank. The module includes: (1) a fuel tank 80% stop-fill subsystem that automatically opens and closes the tank fill port to control tank fuel fill; (2) a hydrostatic back-check valve to prevent reverse fuel flow from the tank to atmosphere via the fill port; (3) an excess fuel bypass return check valve that maintains a predetermined amount of pressure in the fuel line as required to achieve acceptable engine performance; (4) a return check bypass valve that bypasses the return check valve to allow an extra amount of vapor-purging liquid fuel to be flushed through the system and returned to the tank through the fill solenoid prior to engine start-up; (5) an excess flow valve to limit fuel flow to atmosphere in case of a severed fuel line; (6) a supply solenoid valve assembly that prevents fuel flow to the engine if the solenoid is not energized; (7) a supply line over-pressure check valve to prevent a pump outlet line from being overstressed due to pressure build up; (8) a tank pressure relief valve; (9) a tank drain valve; (10) a "leak-free" electrical coupling; and (11) a fuel pod assembly housing one or two fuel pumps pumping either in parallel or series flow.

51 Claims, 10 Drawing Sheets

LIQUID PROPANE FUEL DELIVERY SYSTEM

FIELD OF THE INVENTION

This invention relates to pressurized fluid fuel storage and delivery systems, and more particularly to a vehicle-mounted liquid propane fuel tank system for storing and supplying propane in liquid form to the fuel injectors of an internal combustion engine of an automotive vehicle.

BACKGROUND OF THE INVENTION

Atmospheric pollution resulting from products of combustion of hydrocarbon fuels, particularly those eminating from the exhaust of gasoline-fueled automotive internal combustion engines, is a well recognized environmental pollution problem. Much effort and research has gone into the development of vehicle engines operable on various lighter hydrocarbon fuels as an alternative to gasoline, such as ethanol, and even those fuels having less complex hydrocarbon molecules with fewer carbon atoms per molecule, i.e., pentane, butane, propane, methane, and even ethane. Natural gas (methane) has been favored because of its abundance and clean-burning performance, low cost and its well known and long use as a fuel for internal combustion engines of the stationary type. However, in order to provide an adequate "on-board" supply for fueling automotive vehicle internal combustion engines, the fuel must be stored in highly compressed form, requiring heavy duty, highly pressurized fuel tanks and fuel system components capable of storing gaseous methane at ambient temperatures ranging up to 125° F. (51.6 C.°) and hence capable of withstanding pressures of several thousand psi. Propane on the other hand, can be stored in liquid form and at much lower pressures than methane (i.e., 0 psi at −44° F.; (−42.2° C.), 125 psi at about 70° F.; (21.1° C.) and 260 psi at 125° F.; (51.6° C.). In certain geographic locations supplies of liquid propane fuel for a variety of uses are already relatively abundant and economical. Therefore much attention in recent years has been devoted to developing automotive fuel systems utilizing propane as the alternative fuel of choice, even though such systems still must deal with the challenges associated with pressurized containment and delivery of such fuel.

Typical vehicle propane fuel tank systems commercially available today supply propane in gaseous form to the engine intake manifold via a carburetor fuel feeding system, and leave much to be desired in terms of fuel efficiency, safety, bulk, complexity of plumbing hardware and fuel handling components such as valve, fittings, etc. and the associated multiplicity of joint connections prone to leakage problems. Such propane fuel tank systems for automotive engine use have a bung welded onto the tank for each valve, etc. that is required. Because of the many welded joints that are required, such fuel tanks are expensive to manufacture and maintain. The potential leak paths are many due to the numerous weld joints, fluid handling components, supply line fitting connections, etc. Such systems require leak testing of their numerous individual components after assembly to a tank, adding further complexity and cost. These factors also contribute to high maintenance and service costs. The vehicle manufacturer is also saddled with relatively high assembly costs due to the variety of valves and fittings that must be threaded onto and connected to the tank and sealed securely.

Proposed EPA and DOT regulations would also be difficult to satisfy with such known systems because of environmental pollution arising from exhausting propane to atmosphere during tank filling operations. Tank overfilling and overflow, as well as the drawbacks of currently available "spit-valve" type propane tank filling equipment are also major contributors to such problems.

Such fuel systems also need to comply with many presently applicable safety standards, such as complying with "crash test" integrity standards and providing for proper evacuation of the fuel in "bonfire" tests to prevent tank rupture and explosion.

Vehicle drivability and engine performance are also important criteria which are not adequately satisfied by presently available propane fuel tank systems for vehicle engine use. So far as presently known, all such commercial systems provide propane to the engine in its gaseous state which makes it very difficult to maintain a proper fuel supply to the engine intake manifold under varying operating conditions. In addition, loss of engine power in such gaseous systems can be in the order of of 10–15%. Engine startability, particularly "hot restart", are further problems not adequately addressed by such known systems.

Until the advent of the present invention as disclosed and claimed hereinafter, so far is known many of the aforementioned problems have remained unsolved or inadequately solved, including inability to safely store on an automotive vehicle pressurized propane in liquid form, and also to safely and reliably supply such propane in liquid form to the engine intake manifold via suitably modified conventional electronically controlled liquid fuel injectors under all engine and vehicle operating conditions in an economical manner while achieving satisfactory engine vehicle performance comparable to gasoline powered vehicles.

OBJECTS OF THE INVENTION

Accordingly, among the objects of the invention are to provide an improved pressurized liquid fuel tank system, apparatus and method capable of both storing propane or similar fuel such as Di Methyl Ether (DME) in a liquid state in a fuel tank and supplying the propane in a liquid state to a variety of fuel-consuming devices and apparatus capable of utilizing such fuel, and more particularly an improved automotive fuel system for storing such fuel in vehicle on-board tank for automatically controlled delivery to fuel injectors of an internal combustion engine of the vehicle, and capable of solving the aforementioned problems in a safer and more reliable and economical manner than hitherto achieved.

SUMMARY AND FEATURES OF THE INVENTION

The liquid propane fuel delivery system, apparatus and method of the present invention accomplish the foregoing and other objects of the invention by providing an improved and rugged fuel manifold and mounting member which serves as the base of a system fluid handling components module that is externally and removably mounted on an appropriate pressurized liquid propane fuel storage tank. This module integrates all of the necessary functions and apparatus required of a propane tank fuel delivery system into a single, "bolt-on" unit and includes several subsystems rendering it safe, well regulated and precision operable for use as the fuel delivery system for supplying liquid propane to the fuel-consuming apparatus, and more particularly via fuel injectors to a vehicle engine. Many of the individual components employed in the manifold mounting module are preferably "off-the-shelf" items commonly used in the gaseous fuel and gasoline fuel delivery industries, such as an excess flow valve, check valves, pressure relief valve, fuel pumps, solenoids, etc., to thereby reduce manufacturing cost. The mounting manifold is preferably a one-piece aluminum casting made by the lost-foam casting process and provided with an internal fluid flow passage design that optimizes the flow path for maximum fuel flow and proper evacuation of the fuel tank in a bonfire test. All of the system components thus can be readily and easily top-mounted to the fuel tank and removed therefrom as a unit.

The tank-mounted system module includes a fuel tank 80% stop-fill subsystem with a fill solenoid valve assembly that substantially opens and closes the tank fill port to control fuel fill into the fuel tank. The fuel tank fill apparatus also includes a hydrostatic back-check valve to prevent reverse fuel flow from the tank to atmosphere via the fill port. The system and apparatus also provides for engine fuel return to the tank via a return check valve that maintains a predetermined amount of pressure in the fuel line as required to achieve acceptable engine performance. The fuel return path of the system also includes a return check bypass valve that bypasses the return check valve to allow an extra amount of vapor-purging liquid fuel to be flushed through the system and returned to the tank through the fill solenoid prior to engine start-up.

The system module also includes a fuel supply subsystem that includes an excess flow valve which limits the flow of fuel to atmosphere in case of a severed fuel line. This supply subsystem also includes a supply solenoid valve assembly which is operable to open and close the fuel supply passage to the engine so that no fuel can flow to the engine if the solenoid is not energized. A supply line over-pressure check valve is also included in the supply subsystem that prevents a tank-interior, pump outlet flexible fuel line from being overstressed due to pressure build up, as when the module is removed from the tank for service.

As further safety features, the module provides a fuel tank pressure relief subsystem including a pressure relief valve which prevents the fuel tank from rupturing due to excess pressure occurring as a result of fire, over fill, or thermoexpansion of the liquid propane in the tank. The system module also includes a sealed electrical connector which provides a "leak-free" means of electrical coupling to the system fuel pump, solenoids, level sensor, etc. so that they can be monitored and/or controlled by a source external to the fuel tank, such as by an existing Engine Electronic Control Unit (EECU) already provided on the vehicle or by a separate electronic control unit such as the propane tank system electronics provided as part of the system of the invention (hereinafter referred to as the "System Electronic Control Unit", i.e., SECU) or by a power supply and mechanical switches.

Another useful feature of the system is a fuel tank drain subsystem including a drain valve which allows propane in either liquid or vapor form to be removed from the tank in order to empty the tank when needed to service the fuel system components or to provide fuel to an auxiliary device such as a generator.

The manifold mounting module of this system also includes a fuel pod assembly comprising a fuel pump housing of the "bottom-referencing" type, i.e., mounted on vertical slides from the mounting manifold and spring biased to allow the pump housing to "seek" the bottom of the fuel tank. The pump pod housing can be made by molding, casting, extrusion, etc., of a variety of suitable materials such as plastic or aluminum, and flow interfaces to the mounting manifold via a flexible fuel line suitable for use in propane.

As further features, the pump housing supports the following components:

(1) one or two fuel pumps running either in parallel or series (to respectively provide greater fuel flow or greater fuel pressure) as required;

(2) inlet fuel filter(s) which prevents contaminants from entering the fuel system;

(3) a fuel tank level sensor, preferably of the "off-the-shelf" gasoline "automotive-proven" type which provides its usual reliable, accurate monitoring of the fuel level in the tank, and which is modified in accordance with the control circuitry aspect of the present system to provide additional function signals to drive an automotive instrument panel fuel gauge, and/or control the fill solenoid automatic "stop-fill" function of the system; and (4) a fuel inlet permanent magnet subassembly for the fuel pump or pumps which prevents the passage of metal particulates that may have passed through the inlet fuel filter.

The fuel pod subassembly also provides a convenient mount for a suitable fuel pressure regulator, if desired, to regulate fuel pump pressure in a "returnless" type fuel system. The mounting manifold may also be provided with a heat fusible safety vent, if desired, to further satisfy the requirements of the aforementioned "bonfire" test.

BRIEF DESCRIPTION OF THE DRAWINGS

Other objects as well as features and advantages of the present invention will become apparent from the following detailed description, appended claims and accompanying drawings (which are drawn to engineering scale unless otherwise indicated) wherein:

DETAILED DESCRIPTION OF THE PREFERRED EMBODIMENTS

General System Layout and Function

Figure 1:
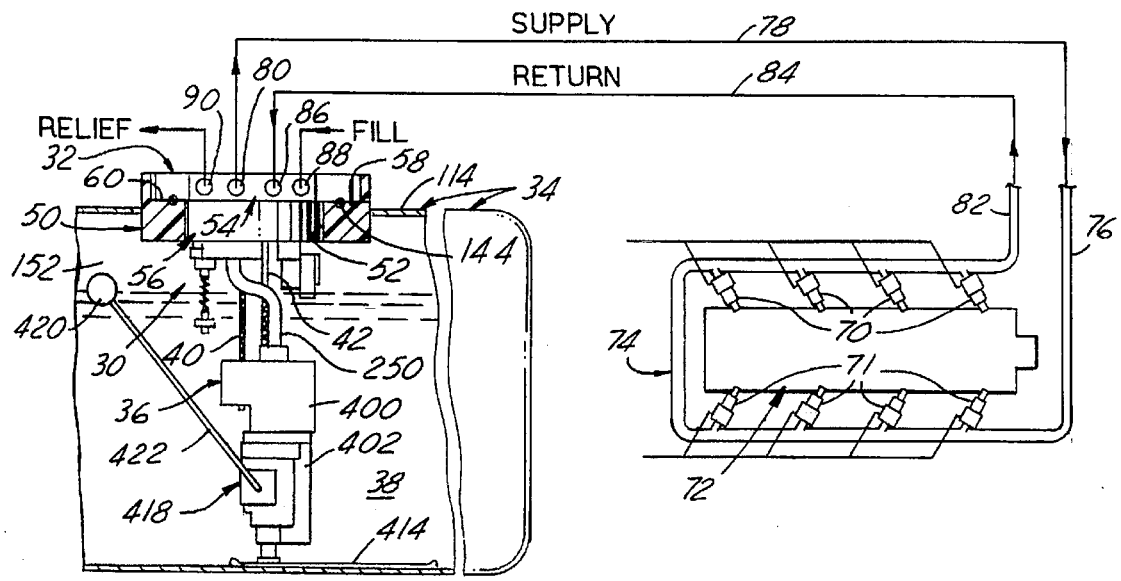
FIG. 1 is a semi-diagrammatic and part fragmentary illustration of a preferred but exemplary embodiment of a liquid propane automotive fuel storage and delivery system incorporating the apparatus and operable in accordance with the method of the present invention.
Figure 2:
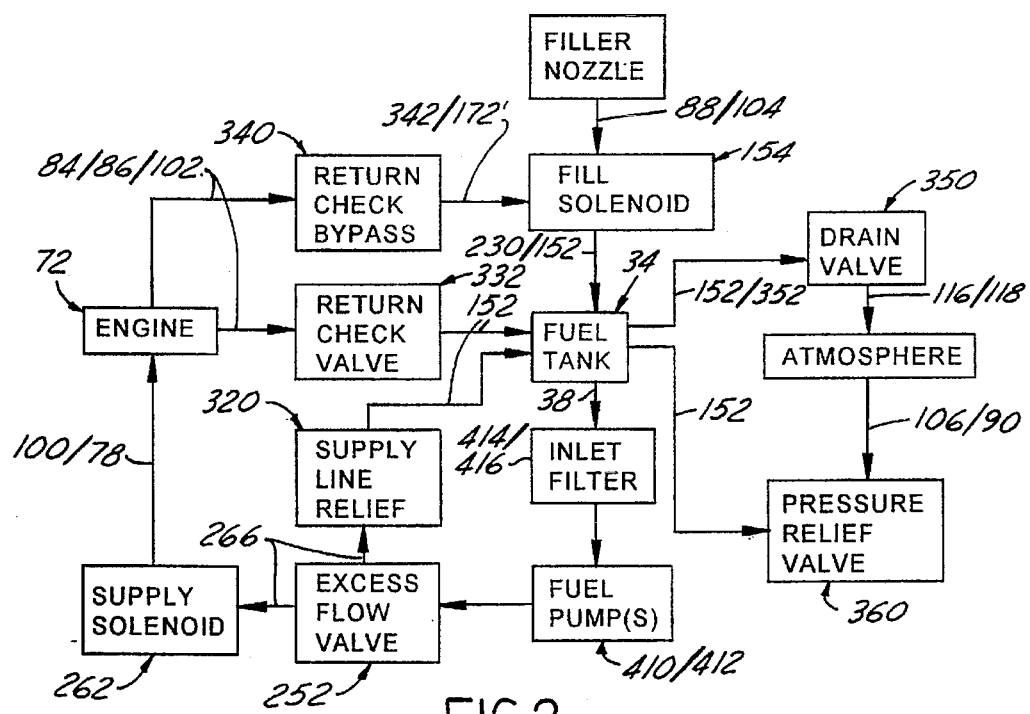
FIG. 2 is a block diagram of the fuel handling components of the system of FIG. 1.

Referring in more detail to FIGS. 1 and 2, the liquid propane automotive fuel system and apparatus of the invention features a tank-mounting module 30 made up of a manifold mounting member 32 on which all of the tank-related components of the system are mounted, and thereby integrated into a single "bolt-on" package for "drop-in" assembly into an associated vehicle-mounted fuel tank 34. Both module 30 and tank 34 are specially constructed to withstand and maintain the propane contents of the tank in a liquid state, with operating pressures ranging up to about 312 psig. Module 30 also includes a "bottom-referencing" type fuel pod subassembly 36 disposed within the interior 38 of tank 34. Pod 36 is thus suspended on a pair of slide rods 40 and 42 from mounting member 32 and spring biased to seek its own level with its bottom foot resting on the bottom wall 44 of tank 34. Tank 34 is provided with a reinforced heavy section mounting platform 50 having a cylindrical through-opening 52 for removable insertion therethrough of those module components mounted to the underside of member 32. The upper end of member 32 is in the form of a disc-like head 54 concentric with a cylindrical valve housing body portion 56 of member 32. Head 54 protrudes radially outwardly at its periphery to form a circular mounting flange portion 58 which is sized to rest on an annular shoulder 60 of platform 50 to thereby support module 30 on tank 34.

In accordance with one principal feature of the liquid propane tank system (LPTS) of the invention, module 30 is constructed, arranged and automatically controlled to pump propane in liquid form from tank interior chamber 38 to the gasoline-type liquid fuel injectors 70, 71 operably mounted to the intake manifolds of a conventional automotive internal combustion engine 72 and controlled by the conventional engine control unit (ECU) (not shown). Injectors 70, 71 are connected in parallel with a special fuel rail 74 which may have a U-shaped configuration in plan view, and adapted for feeding the two banks of injectors 70 and 71. The inlet end 76 of rail 74 is suitably coupled to the outlet of a fuel supply line 78 in turn coupled at its inlet end to a fuel supply port 80 in module head flange 54. The outlet end 82 of rail 74 is coupled by a suitable fuel return line 84 to a fuel return port 86 of head flange 54.

Module 30 of the system is also constructed, arranged and automatically controlled to provide a tank fill system and to provide system pressure relief functions, head 54 also being provided with tank-exterior ports 88 and 90 respectively operable in conjunction with these interrelated functions.

Fuel Tank Flange/Valve Housing Assembly 54/56

Figure 3:
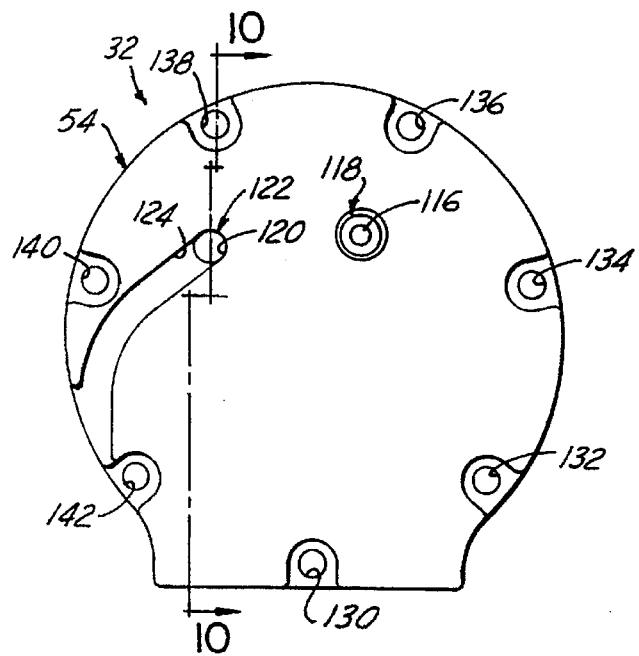
FIG. 3 is a top plan view of the tank-mounting flange/valve housing manifold module employed in the system of the FIGS. 1 and 2, shown by itself.
Figure 4:
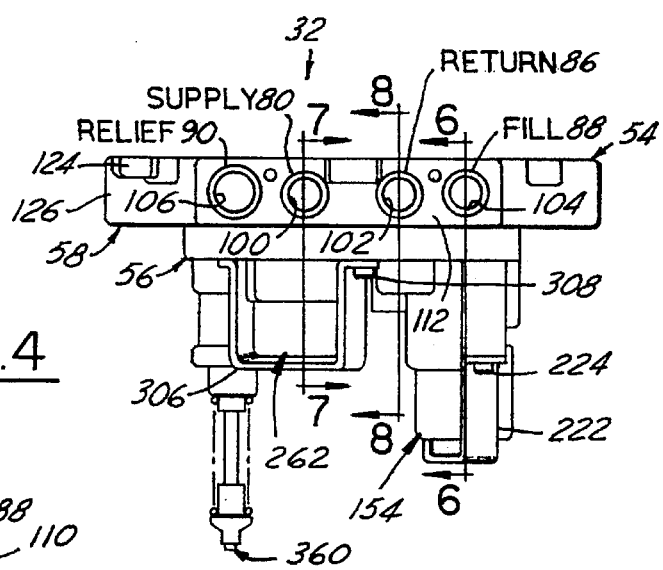
FIG. 4 is a vertical elevational view of the module of FIG. 3.
Figure 5:
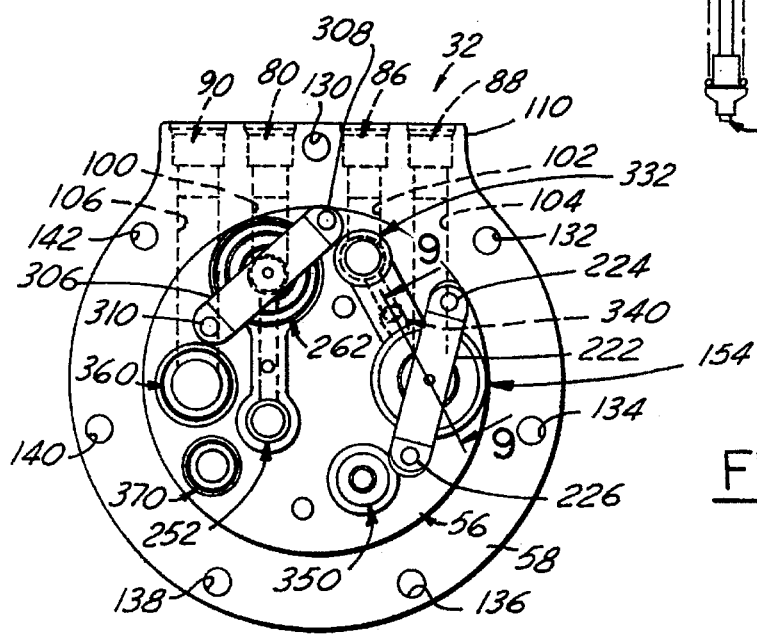
FIG. 5 is a bottom plan view of the module of FIGS. 3 and 4.

Referring in more detail to FIGS. 3–5, the manifold mounting member 32 of module 30 preferably comprises the valve housing body 56 and exterior manifold mounting flange 54 integrated together as a one-piece casting manufactured from aluminum alloy utilizing the "lost foam" casting process. This casting is pressure sealed against porosity leakage by impregnation with a suitable plastic resin (e.g., Ultra-Seal™) in an autoclave process. The casting is suitably cored and machined to a smooth finish to provide large interior fluid flow passageways 100, 102, 104 and 106 respectively individually associated with ports 80, 86, 88 and 90 (FIGS. 4 and 5). The interior ends of these passageways make right angle turns into associated valve component mounting bores (described in more detail hereinafter) which open to the underside of the valve body housing 56. Preferably exterior access ports 80, 86, 88, 90 are aligned in a row in a flange boss 110 having a flat front face 112 such that the axes of the ports are disposed slightly above and parallel to the plane of the top wall 114 of tank 34.

Cast body 54/56 is also provided with a drain valve passageway 116 (FIGS. 3, 5 and 8) leading from the underside of valve body 56 upwardly through the casting to a top-face accessible drain valve port 118. Another top-to-bottom through passageway 120 is also provided in flange/housing 54/56 to provide an electrical connector port 122 accessible on the top face of flange 54 and leading into a recessed wiring harness channel 124 running from port 122 along the top face and exiting at the side face 126 of flange 54 (FIGS. 3 and 4).

Seven mounting bolt throughholes 130–142 (FIGS. 3 and 5) are circumferentially spaced around flange 54, and tank platform 50 is likewise provided with a registering array of threaded blind holes so that module 32 is removable mountable and attached to tank 34 by seven socket head studs (not shown). A flange-to-tank interface high pressure seal is provided by a nitrile O-ring 144 (FIG. 1) recessed into a corresponding groove provided in shoulder 60 of tank platform 50.

Tank Fuel Fill Components of Flange/Housing Assembly 32

Fill Valve 154

Figure 6:
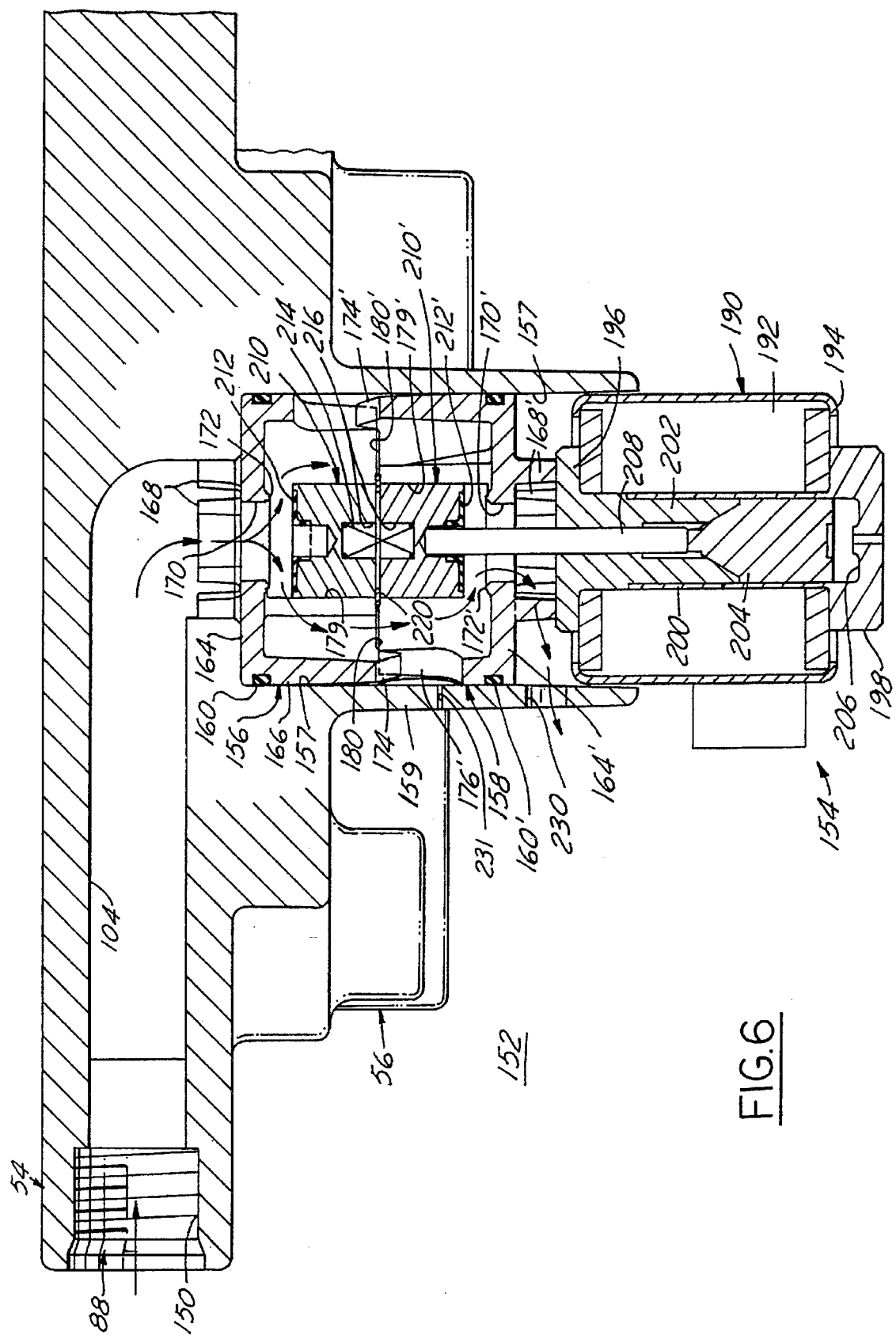
FIGS. 6, 7 and 8 are vertical cross sectional views taken respectively on the section lines 6—6, 7—7 and 8—8 of FIG. 4, but enlarged thereover.

As best seen in FIGS. 4, 5 and 6, tank 34 is filled with pressurized liquid propane from a suitable source of supply of the same (not shown) provided with an industry-standard fuel hose, associated male nozzle carrying O-ring seals (not shown) and operator and/or automatic controlled shut-off valving. Fill port 88 of housing flange 54 has a threaded counterbore 150 (or other suitable releasable coupling connection) located at the entrance way of passageway 104 adapted for threadably and sealably receiving an outlet connector fitting of a conventional filler-neck-type conduit (not shown) in turn having an inlet adapted to receive the fill hose nozzle therein. Passageway 104 communicates at its interior end through a right angle turn with a fill valve assembly 154 (FIG. 6). Fill valve 154 is specially constructed in accordance with a further feature of the present invention to automatically open and close the tank fill port passageway 104 to thereby control fuel fill into fuel tank 34 as well as to prevent reverse flow of fuel from the tank to atmosphere through fill port 88.

Figure 6A:
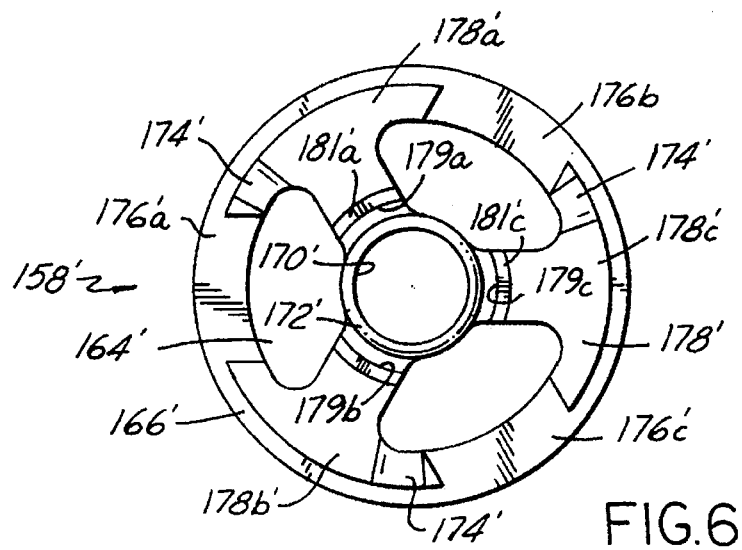
FIGS. 6A, 6B and 6C are respectively top plan, center sectional and bottom plan detail views of the lower one of the pair of fuel disks employed in the fill solenoid valve assembly of FIG. 6, FIG. 6B being a view taken in section of the line 6B—6B of FIG. 6C.
Figure 6B:
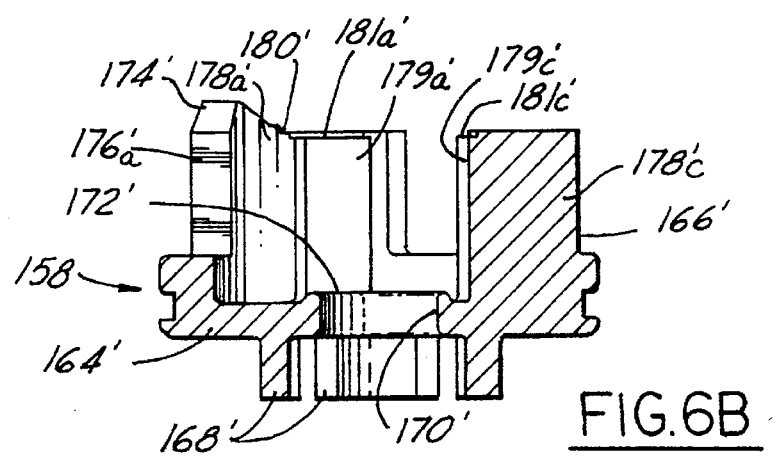
Figure 6C:
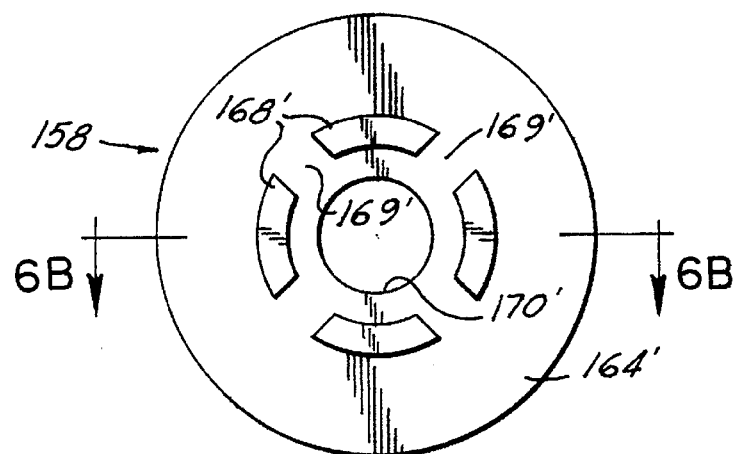

Fill valve assembly 154 includes a pair of similar fuel disks 156 and 158 mounted back to back in a cylindrical bore 157 of a tubular mounting boss 159 open at its lower end and protruding downwardly as an integrally cast extension of the body into the vapor dome 152 of tank 34. Fuel disk 156 (see also FIGS. 6A, 6B and 6C wherein disk 158 is given like reference numerals raised by prime suffix for like features) is sealed in bore 157 by an O-ring 160 carried in a groove of the disk. Disk 156 has a generally cup-like configuration defined by an end wall 164 integrally joined at its outer periphery to a radially inset cylindrical interrupted side wall 166. The groove for seal 160 is formed in the periphery of wall 164. An annular row of arcuate fingers 168 (FIGS. 6B and 6C) protrude axially from end wall 164 and surround a central passageway 170 leading to an annular valve seat 172 on the interior side of end wall 164. Side wall 166 is defined by three valve guide members 178a, 178b and 178c equally circumferentially spaced apart by intervening fluid flow notch slots 176a, 176b and 176c (see FIGS. 6A and 6B). The free end edge 180 of each guide 178 at side wall 166 is preferably provided with a locking tang 174 to register with an opposed slot 176 of the opposed disk. A semi-circular valve guide surface 179a, 179b and 179c is formed on a radially inwardly protruding portion of each guide member 178a, 178b and 178c and extends axially in the interior of fuel disc 156 between and concentric with passage 170 and side wall 166 and terminates substantially flush with the open edge 180 of disk 156. Guides 178 and 178' are oriented in angularly staggered relationship opposite one another and maintained in this orientation by the interlocked engagement of fingers 174, 174' with the associated juxtaposed notches 176' and 176.

Fill valve subassembly 154 (FIG. 6) also includes a solenoid assembly 190 comprising a annular solenoid coil 192 enclosed in a retainer shell 194 and surrounding upper and lower pole pieces 196 and 198. Lower pole piece 198 has a tubular extension 200 which telescopically receives in assembly a hollow cylindrical extension 202 of upper pole piece 196. A cylindrical armature piece 204 slides in pole tube 200 for travel between upper and lower abutment stop limits defined by upper pole piece extension 202 and the interior end wall 206 of the cap of pole piece 198. A push rod 208 slides freely in a center through-bore of pole piece 196, and abuts at its lower end on armature 204 and protrudes at its upper end through passageway 170' into fuel disc 158. A cylindrical valve body 210' is mounted with a slip fit onto the upper end of push rod 208 and carries on its lower side a valve seat sealing disc 212'. An identical valve body 210 is lost motion coupled coaxially with valve body 210' by hydrostatic forces and by a compression coil spring 214 whose opposite end coils bottom in spring cavities 216 and 216' of valve bodies 210 and 210' respectively. A stop washer 220 is held in assembly between the juxtaposed end edge shoulders 181a, 181b, 181c and 181a', 181b' and 181c' of guide members 178, 178' (FIGS. 6A and 6B) of fuel disks 156 and 158, and its inner periphery protrudes into the travel path of bodies 210 and 210' to define therebetween an upper limit travel stop for valve body 210' and a lower limit travel stop for valve body 210.

Fuel disks 156 and 158 as well as solenoid assembly 190 are held in an abutted stack-up assembly in counterbore 157 by a U-shaped sheet metal retainer strap 222 and a pair of mounting screws 224 and 226 (FIGS. 4 and 5) threaded into suitable threaded sockets in mounting boss 160.

Valve assembly 154 thus functions as a two-stage opposed valve with the valve bodies 210 and 210' slidably retained in a common valve cage formed by disks 156 and 158. Lower valve body 210' serves as the solenoid actuated primary valve to serve two functions, namely as a stop fill valve and as a return check bypass valve (described in more detail hereinafter). Upper valve body 210 functions as a secondary valve actuated between closed and open positions by fluid fill flow pressure differentials and serves as a hydrostatic back check valve. Vertical centering of valve bodies 210, 210' in their respective valve cage disks 156 and 158 at their travel open stop limits is assured by stop washer 220. At the upper travel limit of valve body 210, its seal 212 engages valve seat 172 to close communication between passageway 104 and the common interior of disks 156 and 158.

At the lower travel limit of lower valve body 210', its seal 212' engages valve seat 172' to close communication between the common interior of fuel disks 156, 158 and tank vapor dome 152. Full liquid flow communication between dome 152 and passageway 170' is provided by the four openings 169' (FIG. 6C) between fingers 168' and by a downstream outlet passageway exemplified by a port 230 (FIG. 6) provided in the tubular wall of boss 159 axially between solenoid 190 and fuel disk 158. Preferably, in lieu of port 230 the tubular wall of boss 159 is circumferentially interrupted to provide a large liquid flow area outlet passageway to the tank dome 152 for rapidly delivering thereto incoming tank filling liquid propane exiting passageway 170'. Upper valve body 210 is maintained normally closed by the force of spring 214 and hydrostatic vapor pressure of propane in the common interior of fuel disks 156 and 158. The solenoid actuated lower valve body 210' is maintained normally closed (solenoid 192 de-powered) by the force of spring 214 and as initially assisted by hydrostatic pressure within the interior of fuel disks 156, 158.

A restricted orifice 231, for example of 0.020" diameter, is provided through the wall of boss 159 to vent the common interior space of disks 156 and 158 to tank dome 152 to thereby equalize pressure therebetween when valve body 210' is closed and the liquid filling operation is terminated by shut-off of the fuel supply hose fill nozzle. Once automatic closure of valve body 210' on seat 172' has occurred, the flow of incoming liquid fuel from the supply to the tank interior is severely limited due to the restricted communication then offered only by orifice 231 to the tank interior; thereby indicating to the tank fill operator to shut-off the supply hose nozzle and/or tripping an automatic hose nozzle shut-off valve.

In operation, when the fuel hose supply nozzle is coupled to port 88 to commence the fill operation, pressurized liquid propane fuel from the supply is communicated via passageway 104 with valve passageway 170, and the supply pressure differential (usually about 100 psi above tank interior pressure) is sufficient to force valve body 210 downwardly from its normally closed position to a partially open position. Valve body 210 will then be so forced to its fully open position shown in FIG. 6 if or when solenoid 190 is actuated to lift valve body 210' off seat 172' to thereby open full liquid fill flow communication via passageway 170' between the common interior of disks 156, 158 and vapor dome 152. When tank 34 has been filled to a predetermined stop-fill level, preferably approximately 80% full, with liquid propane (as illustrated in FIG. 1), the fuel filling operation is automatically stopped by the system control circuitry responding to the level signal from level sensor 418 and thereby de-energizing solenoid 190 to allow valve body 210' to be pushed downwardly by spring 214 and supply fill pressure to bring seal 212' into firm sealing engagement with seat 172'. This primary valve closure essentially blocks incoming fill flow from the fill hose, thereby indicating to the fill operator and/or hose valve to shut off the fuel fill hose. Once the fill hose is shut off, the drop in fill pressure then enables spring 214 to also force upper valve body 210 upwardly into closed condition. Seal 212 will then firmly engage valve seat 172 due to the hydrostatic pressure differential acting on the opposite working faces of valve body 210. That is, once passageway 104 is depressurized by shut-off of fuel supply from the fill hose, the hydrostatic pressure of the liquid and gaseous propane fuel trapped downstream of the closed valve passageway 170 within the interior of fuel disks 156 and 158 and tank dome 152 (via orifice 231) will produce a pressure differential relative to passageway 104 which will securely maintain upper valve body 210 closed by hydrostatic force. Valve body 210 thus operates in the non-filling mode as a hydrostatically actuated back check valve between tank interior 38/152 and fill passageway 104.

Engine Fuel Supply Components of Flange/ Housing Assembly 32

Excess Flow Valve 252

Figure 7:
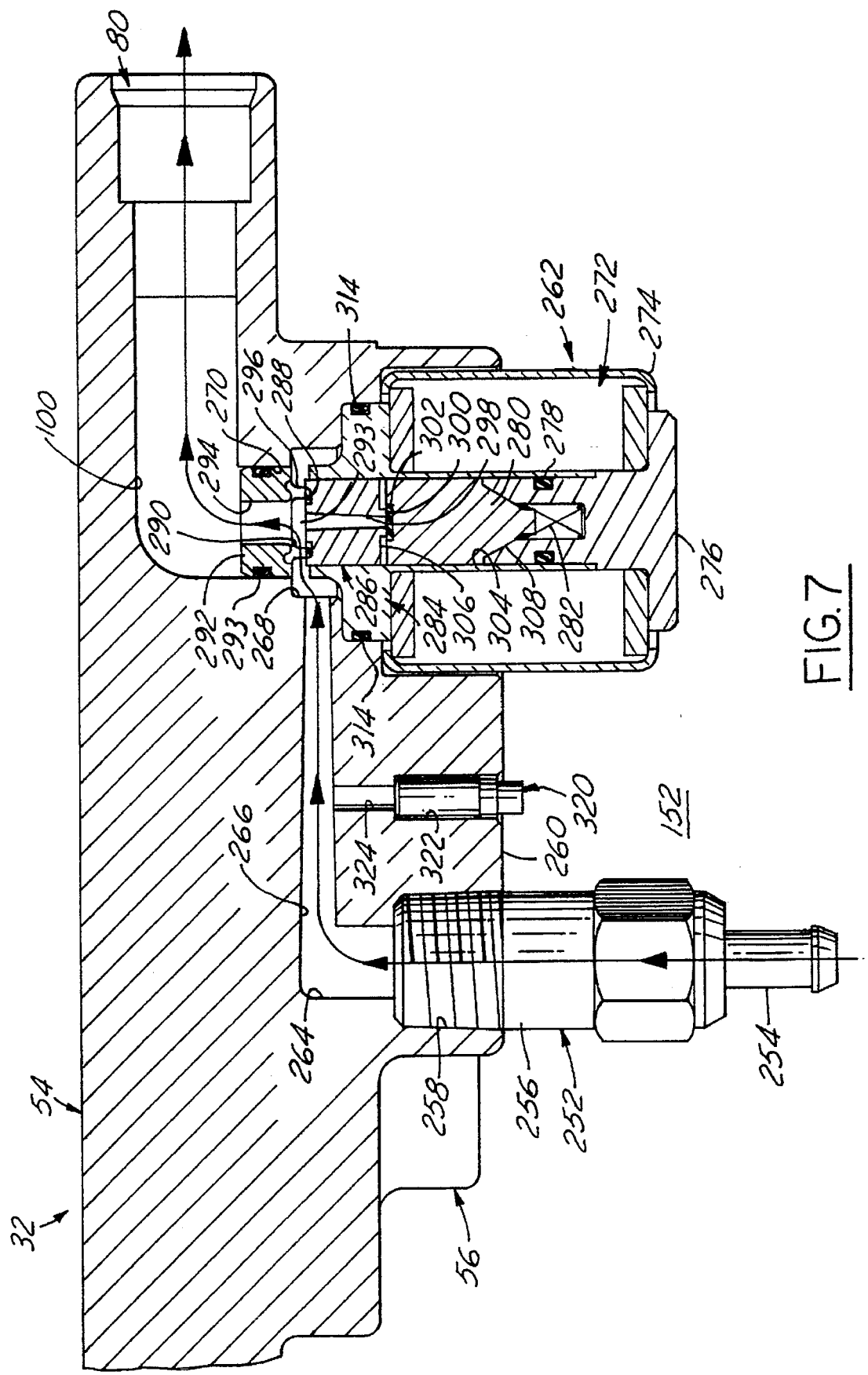

Referring to FIGS. 1, 4, 5 and 7, liquid propane fuel is pumped under pressure from the liquid fuel supply chamber 38 in tank 34 by operation of fuel pod assembly 36. Pressurized liquid propane is pumped into a flexible hose line 250 (FIG. 1) coupled to an excess flow valve 252 (FIGS. 5 and 7). The upper outlet end of hose 250 is received on an inlet nipple 254 of valve 252 as a barbed hose and clamp type coupling. The upper end of the body 256 of valve 252 is threadably mounted in a counterbore 258 opening to the underface 260 of valve body housing 56. Valve 252 preferably is a commercially available excess flow valve, such as that supplied by Sherwood Division of Harsco Corporation of Lockport, N.Y. (Part No. Q1874-10).

Valve 252 thus contains a poppet valve with a restricted flow orifice and associated biasing spring and functions to allow a relatively large volumetric flow of fuel through valve during normal operation when the pressure drop across the valve is low, for example 4 psig, allowing a flow rate of 1.7 gallons per minute. However, in the event that the fuel supply line 78 to the engine is severed, as in an accident, and fuel line supply valve assembly 262 is in open condition, the resultant sudden increase in the pressure drop across valve 252 will cause it to respond and thereby limit maximum flow through valve 252 from the pump to a very small quantity via a restricted orifice in the internal poppet of valve 252.

Liquid propane pumped through valve 252 flows via a short vertical passageway 264 into a horizontal passageway 266 leading to a counterbore 268 formed in flange 54 coaxial with the interior vertical bore 270 forming the interior end of horizontal supply passageway 100.

Fuel Supply Valve 262

Referring to FIGS. 4, 5 and 7 the flow of liquid fuel from passageways 266, 268 to passageway 100 and thence to the engine supply line 78 is controlled by the main fuel supply solenoid valve assembly 262 which in turn is automatically controlled in accordance with the control circuitry and system of the invention as described in more detail hereinafter. Solenoid valve assembly 262 preferably utilizes most of the components of a commercially available two-stage pilot type valve such as that available from Advanced Fuel Components, Inc. of Marshall, Mich. (Part Nos. 141-15; armature: 141-16; valve: 141-08; solenoid coil). Valve assembly 262 thus includes a coil assembly 272 mounted in a housing shell 274, a lower pole piece 276 modified to carry an O-ring seal 278, an armature 280 biased away from pole piece 276 by a coil spring 282, an upper pole piece 284 and a pilot-type valve body 286. Valve body 286 is made of ferromagnetic material (steel) and carries an annular seal ring 288 in its upper face adapted to seat and seal against an annular valve seat 290 to close communication between counterbore 268 and passageway 100. Upper pole piece 284 is modified to have an upper valve cage extension 292 carrying an O-ring seal 293 and slidably and sealably mounts in bore 270. Extension 292 has a central valve passageway 294 open between passageway 100 and valve seat 290 and when valve body 286 is moved open, communicating with a ported valve chamber 293 formed within spaced legs 296 connecting extension 292 with the main body of pole piece 284.

Valve body 286 is provided with a small diameter pilot through-passage 298 surrounded at its lower by a small diameter annular protuberance 300 which forms a valve seat when engaged with a valve seat seal disk 302 carried on the upper end of armature 280. When solenoid coil 272 is de-energized, spring 282 forces armature 280 upwardly and it drives valve body 286 to closed position with seal 288 engaging valve seat 290 and valve seat 300 engaging valve seal 302. Due to the sliding clearance between valve body 286 and the bore 304 of pole piece 284, as well as the sliding clearance between armature 280 and bore 304, liquid fuel from counterbore 268 can act on the working surface 306 of valve body 286 as well as on the working surface 308 of armature 280 to thereby hydrostatically maintain valve body 286 closed against seat 290 and armature 280 against seat 300.

When solenoid coil 272 is energized to open valve assembly 262, armature 280 is electromagnetically moved downwardly to first disengage seal 302 from engine supply flow through valve seat 300 to thereby open pilot passage 298 and thus balance the hydrostatic forces exerted on valve body 286. The electromagnetic force produced by coil 272 is then effective to draw valve body 286 downwardly to disengage seal 288 from seat 290 and thereby open the main flow passage from counterbore 268 into passageway 100 via chamber 293 and pole passageway 294. Hence with this type of two-stage pilot valve less electrical power is required to operate the solenoid valve assembly 262 from closed to open position, thereby reducing system power consumption and heat generated by operation of solenoid valve assembly 262. The size and cost of the solenoid coil 272, and hence valve assembly 262, is also thereby reduced.

The foregoing components of solenoid valve assembly 262 are firmly held assembled in a tandem stacked-up array by a U-shaped stamp steel retainer 306 and two mounting screws 308, 310 (FIGS. 4 and 5), with the upper end of the main body of pole piece 284 abutting the shoulder of a counterbore 312 and sealed therein by an O-ring 314. O-ring 278 of the lower pole piece 276 is then sealed in engagement with the wall of bore 304 to prevent fuel leakage back to the vapor dome of the tank via the sliding clearances of the parts received in bore 304.

Supply Line Pressure Relief Valve 320

The fuel supply subsystem also includes a fuel supply line pressure relief valve 320 (FIGS. 4 and 7) press fit mounted in a counterbore 322 opening to the bottom face 260 of body 56 and communicating via a bore 324 with passageway 266 between excess flow valve 252 and fuel supply valve 262. Relief valve 320 is preferably a commercially available pressure relief check valve such as that supplied by Lee Company of Westbrook, Conn. (Part No. PCRM5502014S). Valve 320 thus functions to open flow from passage 266 through valve 320 to the tank vapor dome 152 when the pressure differential across the valve reaches, for example, 80 psig. Valve 320 thus prevents the flexible fuel pump outlet hose line 250 from being overstressed due to excessive pressure build up, as when the flange/housing 54/56 is being demounted from tank 34 for service of the components of module 30. Valve 320 also functions as a back check valve to prevent fluid flow from the tank vapor dome 152 to passage 324 via passageway 322/324.

Engine Fuel Return to Tank

Return Check Valve 332

The fuel return subsystem includes the return line 84 provided at its outlet end at module 30 with a standard male nozzle coupling employing O-rings (not shown) which is inserted into a standard female O-ring socket member (not shown) mounted in the bore 330 of return port 86 (FIG. 8) (as by threads as shown, or other suitable type of connection) to thereby communicate return line 84 with return passageway 102.

The fuel return subsystem also includes a return check valve 332 (FIGS. 5 and 8) threadably mounted in a threaded counterbore 334 in a boss 336 protruding from the underside of housing 56 and opening at its upper end to the vertical run of return passageway 102. Return check valve 332 is preferably a commercially available part, such as that supplied by Sherwood Division of Harsco Corporation of Lockport, N.Y. (Part No. Q1874-20). Valve 332 thus functions as a back check valve to prevent fluid flow from vapor dome 152 into passageway 102, and opens to permit flow from return passage 102 into the tank vapor dome 152 (and thus liquid chamber 38) when the pressure differential across valve 332 in this direction reaches approximately 15 psig. Valve 332 thus maintains a predetermined amount of pressure in the fuel supply line 78 and fuel return line 84 as required to achieve acceptable engine performance. The fitting of valve 332 may alternatively be provided with a barbed hose nipple (not shown) at its outlet end for receiving the inlet end of a fuel return hose (not shown) which extends downwardly to have its outlet disposed adjacent the bottom of tank interior chamber 38 so that return fuel is delivered submerged in the body of liquid fuel in tank 34.

Return Check Bypass Valve 340

Figure 9:
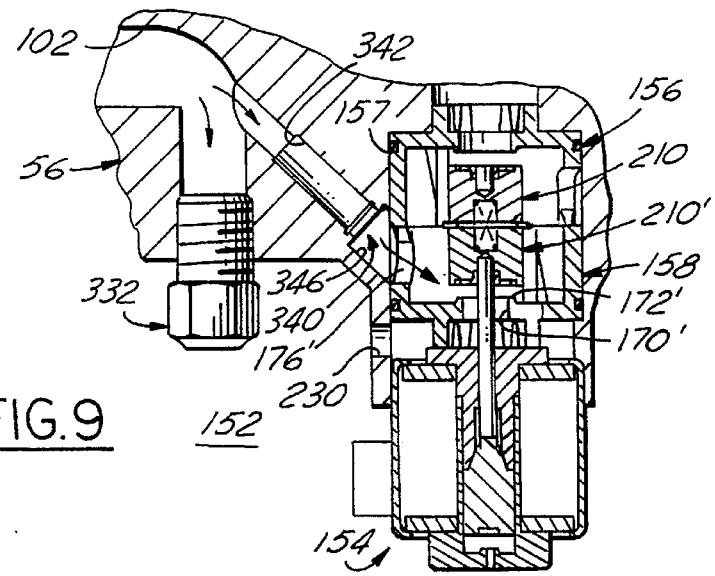
FIG. 9 is a fragmentary vertical sectional view taken on the section line 9—9 of FIG. 5 and enlarged thereover.

The fuel return subsystem further includes a return check bypass valve 340 (FIGS. 5 and 9) mounted at the downstream end of a bypass return passageway 342 having its upstream inlet opening into passageway 102. Preferably valve 340 is a commercially available free-floating disc type check valve with a hair pin type spring retainer clip for limiting bodily movement of the valve body disk in the flow direction, such as that provided by Walbro Corporation of Cass City, Mich. as Part No. 176-536. Check valve 340 is oriented to prevent fluid flow into passageway 342 towards passageway 102, but to open freely in the opposite direction response to a pressure differential of about 0–1 psig across the valve in the downstream direction.

Bypass return passageway 342 opens into a larger counterbore 346 which intersects bore 157 containing the fill solenoid valve assembly 154. Thus when fill valve body 210' is opened under the control of the control system electronic module (SECU), fluid (normally liquid) in return passageway 102 can by-pass return check valve 332 by flowing through return by-pass passageway 342, thence through check valve 340 and via counterbore 346 through the notch openings 176' in fuel disc 158, past valve seat 172' and into valve passageway 170', and thence via the boss vent opening 230 to the tank vapor dome 152. This return bypass operational mode is sequenced with the fuel supply subsystem operational components to allow an extra amount of liquid propane fuel to be flushed through the fuel supply line 78 and fuel return line 84 and returned to tank 34 through the solenoid valve assembly 154 for pre-engine-start-up purging of any fuel vapor in fuel rail 74.

Fuel Tank Drain and Auxiliary Appliance Supply 350

Figure 8:
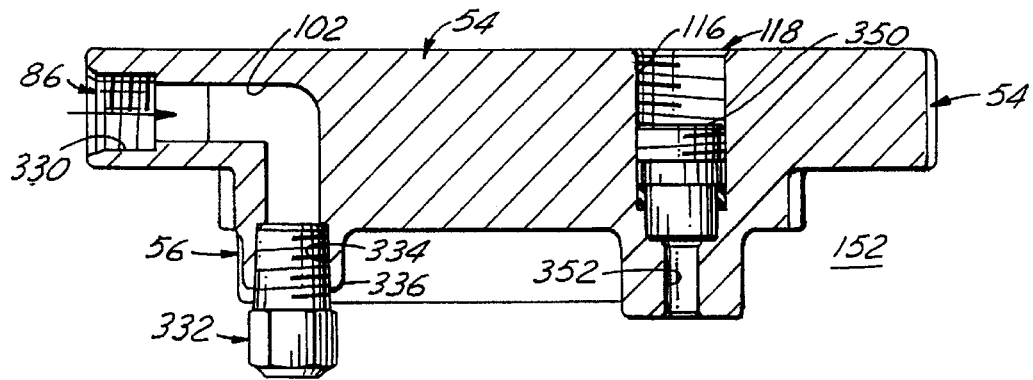

Referring to FIGS. 5 and 8, the system mounting manifold 32 of module 30 also includes a drain valve 350 removably threadably mounted in the threaded passageway 116 to provide for removal of liquid or gaseous fuel from tank vapor dome 152 via a counterbore 352 opening into passage 116. Preferably drain valve 350 is a commercially available valve unit such as that used on portable liquid propane fuel tanks provided for firing barbecue gas grills, and commercially available from Sherwood Division of Harsco Corporation of Lockport, N.Y. as their propane back check module assembly Part No. 3349-20. Hence drain valve 350 may be actuated to open condition by connecting a standard barbecue tank fuel line nozzle into the upper end of valve 350 accessible from the top of flange 54. Valve 350 thus can be used to drain propane gas from vapor dome 152 as and when desired, e.g., to drain liquid propane from the interior of the tank by inversion of the entire tank, to attach a propane appliance hose line to tank 34 for supplying gaseous propane to an auxiliary appliance, such as a barbecue grill or other propane-gas-fired appliances such as heaters, motor generator sets adapted to run on propane gas fuel, etc., and/or to allow either liquid or vapor to be removed from the tank to service the fuel system components.

Fuel Tank Pressure Relief Valve 360

Figure 10:
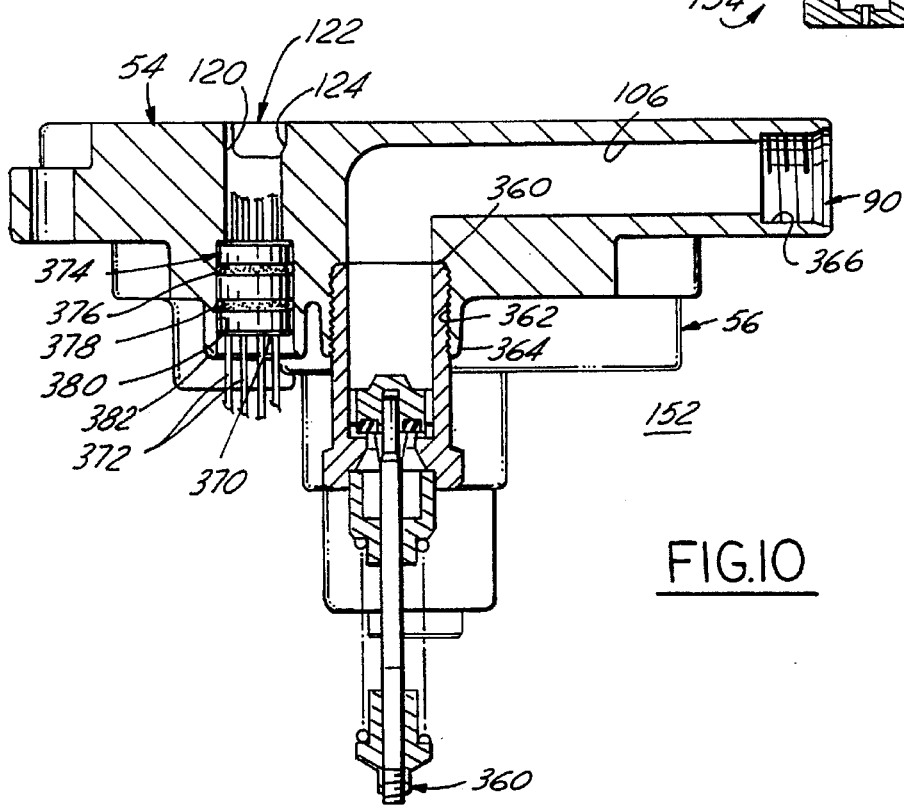
FIG. 10 is a vertical cross-sectional view taken on the section line 10—10 of FIG. 3 and enlarged thereover.
Figure 11:
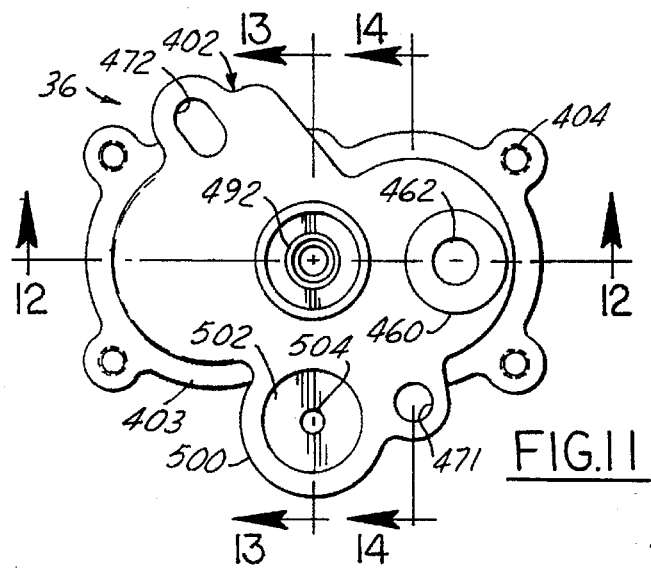
FIG. 11 is a top plan view of the fuel pod assembly shown by itself and enlarged over the illustration thereof of FIG. 1.

Referring to FIG. 10, a pressure relief valve 360 is threadably mounted at its outlet end in a threaded counterbore 362 provided in a boss 364 on the underside of housing body 56 and opening to vapor dome 152. Valve 360 thus communicates as its upper end with the vertical run of the relief passageway 106. Preferably valve 360 is a commercially available pressure relief valve, such as that supplied by Sherwood Division of Harsco Corporation of Lockport, N.Y. as their relief valve part Q1874-40-312. This valve is rated to have an opening pressure of 312 psig and a start-to-discharge rating of 316 to 336 psig, and to provide a flow rate capacity of air of UL; 720SCFM or ASME; 679SCFM.

The relief outlet port 90 is provided with a bore 366 threaded or otherwise adapted to receive a standard female coupling socket for receiving a standard male coupling nozzle to communicate the relief passage 106 with a suitable venting conduit to ambient. This tank pressure relief subsystem via valve 360 and relief outlet passageway 106 is intended to enable tank 34 to pass the fuel tank assembly "bonfire" test. This is achieved by regulating maximum tank interior pressure as determined by the opening set pressure of valve 360 to thereby prevent bursting or explosion of tank 34 from excessive interior pressure generated during this bonfire test. Pressure relief valve 360 also prevents tank rupture due to excessive pressure resulting from tank overfill or thermoexpansion of the liquid propane in the tank, however caused.

Electrical Connections Between System Components and System Control Circuitry

Referring to FIGS. 3, 5 and 10, electrical wiring connections from a control system electronics module (not shown), located externally remote from tank 34, to the electrically operated system components of module 30 are made through a hermetically sealed pass through connector 370 best seen in FIG. 10. Connector 370 is preferably a commercially available hermetic connector such as that supplied by Pave Technology Co. of Dayton, Ohio as their Part SPll-E-4/5/TE18/14-24-24. Connector 370 thus may have eight pass through electrical connector wires 372 protruding from its axially opposite ends. Connector 370 comprises a plastic body 374 externally grooved to carry two O-rings 376 and 378 for press fit insertion and sealing of connector 370 into a counterbore 380 provided in a boss 382 protruding from the underside of valve housing 56. The connector wires are embedded and hermetically sealed in epoxy potting compound contained within body 374. Connector 370 is rated to withstand 5,000 psig through the connector. The leak rating of the O-ring seals 376, 378 to housing 56 is 0.0001 cc/s bubbling at 80 psi air for 2 minutes. The through-connector wires 372 are suitably gaged and preferably use Teflon™ wire insulation.

The tank interior ends of the lead wires are suitably mechanically and electrically coupled to the electrically operated tank-interior components of module 30, namely, fuel supply solenoid valve assembly 262 and fuel tank fill solenoid assembly 154, as well as to fuel pumps 410, 412 and level sensor 418 of the fuel pod assembly 36 be described in more detail hereinafter. The exterior ends of connector wires 372 are led through the recessed channel 124 and out through the side face 126 of flange 54 for connection through a suitable wiring harness to the remotely located system electronic control module. Connector 370 thus provides a leak-free and convenient means of electrical access to the fuel pumps, solenoids, level sensor, etc. so that they can be monitored and/or controlled by a source external to the fuel tank 34, such as the SECU or a power supply and mechanical switches.

Fuel Pump Pod Assembly 36

Referring to FIGS. 1 and 11 through 14, the fuel pump pod assembly 36 of module 30 includes an upper housing 400 and a lower housing 402 which may be injection molded of plastic or die cast of aluminum material as cup-like shells with peripheral mounting flanges 401 and 403 at their open ends and secured together at their open ends by socket head studs 404 and sealed by a gasket 406. The two-part housing 400/402 in the exemplary but preferred embodiment of FIGS. 11–14 supports as a subassembly the following components:

(1) Two identical fuel pumps 410 and 412;
(2) a primary fuel filter 414;
(3) a secondary filter magnet ring 416; and
(4) a fuel level sensor 418 (FIG. 1) with an associated float 420 and float arm 422 mounted to lower housing 402 by a mounting bracket 424 (FIG. 14) secured to lower housing 402 by mounting screws 426.

Fuel pumps 410 and 412 are preferably commercially available automotive fuel pumps such as Walbro Model AOC516M, mounted side-by-side with their axes parallel and with a clearance fit in side-by-side pocket cavities 430 and 432 in lower housing 402. The pump casings individually rest sealably on O-rings 434 and 436 seated in turn on annular shoulders formed in lower housing 402 at the lower end of cavities 430 and 432 respectively. The reduced diameter inlet housings 438 and 440 of pumps 410 and 412 protrude downwardly into fuel inlet chambers 442 and 444 respectively with a stand-off clearance from these chambers.

The upper ends of the casings of pumps 410 and 412 are supported laterally and held down by encircling flange retainer collars 442 and 444 provided with interior and exterior stand off ribs for resilient engagement between the pump casings and the housing walls. The barbed outlet nipples 446 and 448 of pumps 410 and 412 are sealably and resiliently mounted by tubular resilient mounting gaskets 450 and 452 respectively in counterbores 454 and 456 in the upper end wall 458 of upper housing 400. Pumps 410 and 412 are thus mounted with a clearance fit into the housing 400 and 402 and captured axially therein in assembly with a resilient, shock-absorbing mounting system provided by O-rings 434, 436, resilient collars 442 and 444, and mounting tubes 450 and 452.

Upper housing 400 is provided with an upwardly protruding boss 460 having a through-passage 462 through which electrical power leads, running interiorly of the tank from connector 370, are fed to the interior of housing 400 for plug-in electrical power connection thereto of pump terminal spades 464 and 466 of pumps 410 and 412.

The lower end of lower housing 402 has a downwardly protruding boss 468 with the resilient foot cap 470 fitted thereon adapted to seat on the interior surface of tank bottom wall 44 in assembly. Upper housing 402 has guide passageways 471 and 472 for respectively receiving the vertical slide rods 40 and 42 to provide the aforementioned conventional "bottom referencing" mounting interface of the fuel pod assembly with tank 34. The vertical elevation of the fuel pod assembly 36 in tank 34 is thus controlled by this bottom-seeking mount, with the range of pod adjustment travel being controlled at maximum elongation by a preset positive stop and at minimum elongation by the collapsing springs of the mount, foot cap 470 thus being resiliently biased against the interior surface of the tank bottom wall 44.

Preferably primary fuel filter 414 is a commercially available automotive fuel tank filter secured by a mounting screen collar 474 to the open lower end of a cylindrical inlet boss 476 protruding from the bottom wall of lower housing 402. The particulate-entrapping magnet ring 416 is also a commercially available part which fits into a counterbore 478 of boss 476 to thereby define the fuel inlet passageway 480 for the pump housing immediately downstream of filter 414, which in turn is submerged at the lowest elevation of the body of liquid propane occupying the tank interior chamber 38.

Figure 12:
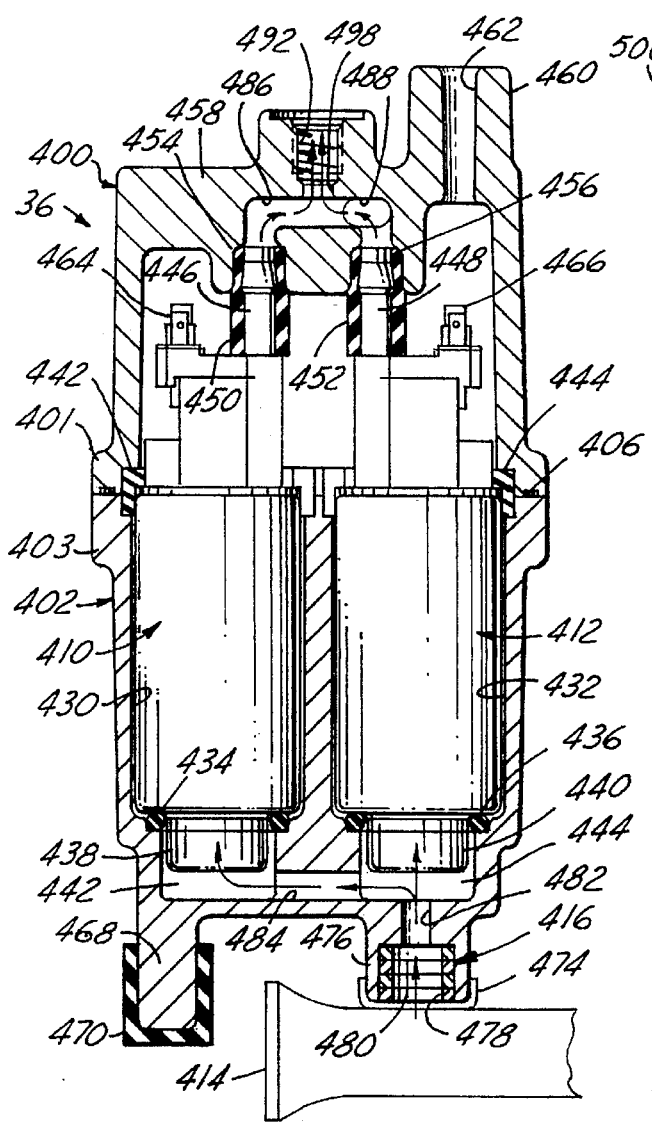
FIGS. 12, 13 and 14 are vertical cross-sectional views taken respectively on the section lines 12—12, 13—13 and 14—14 of FIG. 11.
Figure 13:
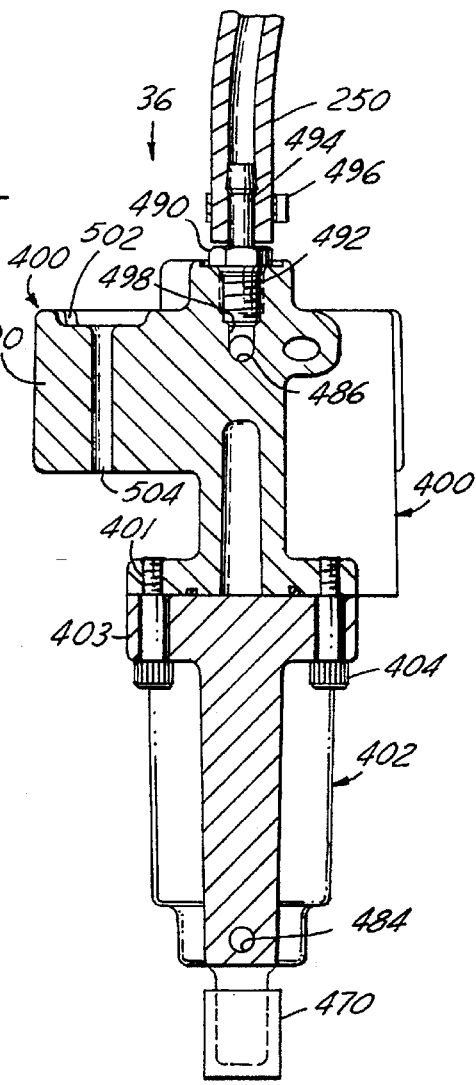
Figure 14:
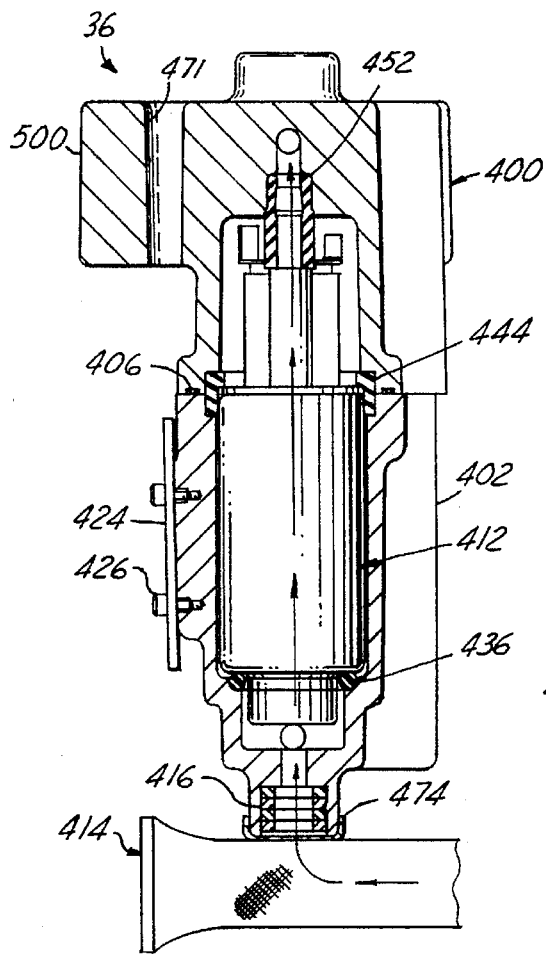

Fuel is drawn by pump suction through passageway 480 into pump housing inlet chambers 442 and 444 via a housing bore 482 extending between inlet passageway 480 and chamber 444. Chambers 442 and 444 are interconnected by a housing cross passageway 484 so that either or both of the pumps 410 and 412 can draw filtered liquid propane fuel into their respective pump inlets from the fuel tank chamber 38. In the illustrated embodiment of FIGS. 11–14, the pumps are arranged in housing 400/402 for operation in parallel liquid pumping flow relationship. Hence the pump outlet nipples 446 and 448 respectively communicate with housing manifold passageways 486 and 488 which converge and interconnect at a common pump housing outlet fitting 490 (FIG. 13) threadably mounted in a housing outlet bore 492 (FIG. 12). The inlet end of flexible fuel line 250 receives the barbed outlet nipple 494 of fitting 490 and is secured thereto by a hose clamp 496. Fuel line 250 thus communicates with a common outlet passageway 498 of upper housing 400 which in turn is parallel-pump fed by passages 486 and 488. It is to be understood that pumps 410 and 412 are each provided with a conventional outlet check valve which prevents reverse flow of fuel back into outlet nipples 446 and/or 448.

If desired, upper housing 400 may be provided with a lateral extension 500 (FIGS. 11 and 13) having a mounting platform 502 and a through-passage 504 adapted for receivably mounting a conventional fuel bypass pressure regulator in those installations where it is desired to regulate fuel pump pressure in a "returnless" fuel system, as when the fuel pump housing is used as a component of a conventional fuel-injected marine engine gasoline fuel system to thereby do double-duty as a standardized part for two different types of fuel systems.

Alternate Fuel Pump Pod Assembly 36'

Figure 15:
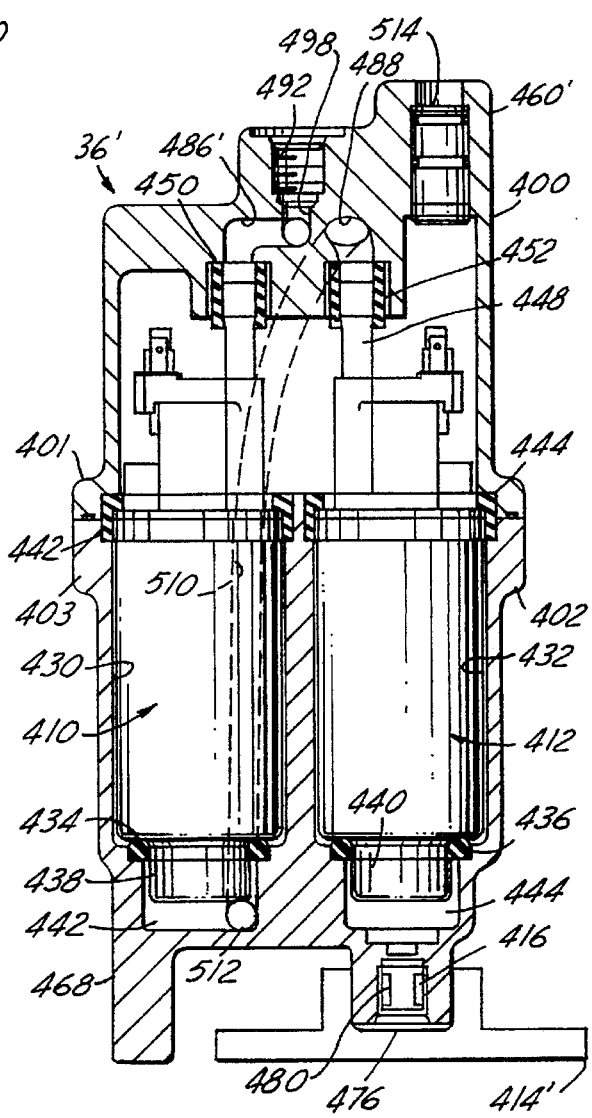
FIG. 15 is a view similar to FIG. 11 but illustrating a modified embodiment of a fuel pod assembly with dual fuel pumps arranged in series flow relation.

Referring to FIG. 15, an alternate fuel pump pod assembly 36' is illustrated wherein components identical to those of pod assembly 36 are given like reference numerals, and those similar in function are given a like reference numeral raised by a prime suffix, and for brevity their description not repeated. In the modified fuel pump pod assembly 36', fuel pumps 410 and 412 are fuel flow interconnected to operate in series pumping flow relationship to thereby provide greater fuel pump output pressure as delivered to the fuel line hose 250, as may be required in certain fuel system applications. By contrast, fuel pump pod assembly 36, wherein pumps 410 and 412 are interconnected in parallel pumping flow relationship, provides a greater volumetric fuel flow output rate but lower maximum combined pump output pressure, as may be required in other fuel system applications.

To achieve the manufacturing conversion from the parallel flow set up of pod assembly 36 of FIGS. 11-14 to the series flow relationship of the pumps in the modified pod assembly 36' of FIG. 15, all that is required is to eliminate or block the cross passage 484 of lower housing 402 so that all incoming fuel flowing through filter 414' and magnet ring 416 into chamber 444 flows into the inlet 440 of pump 412. In addition, intercommunication between the pump outlet manifold passages 486 and 488 of housing 400 is modified in upper housing 400' to block the same. In addition, the manifold outlet passage 488' communicating with the outlet nipple 448 of pump 412 is rerouted to communicate with a series flow passageway 510 (shown diagrammatically in hidden lines in FIG. 15) provided in the outer wall material of upper and lower housing 400' and 402'. Passageway 510 leads to an outlet port 512 communicating with the inlet chamber 442 feeding the inlet 438 of pump 410. The manifold outlet passage 486' communicating with the outlet nipple 446 of pump 410 thus connects only to the outlet passage 498 which in turn communicates via fitting 490 with fuel line hose 250 as before.

In the operation of the modified fuel pod assembly 36', pumps 410 and 412 may be operated as a two-stage in-series array so that the pressure of liquid propane produced by the output of first stage pump 412 is provided in the inlet chamber 442 for supplying liquid at elevated pressure to the second stage pump 410. Pump 410 in turn boosts this input pressure to an essentially doubled output pressure at output manifold passageway 46' when both pumps 410 and 412 are simultaneously energized from the pump power supply through suitable connections from the electronic control circuitry of the system as described hereinafter when computer programmed to produce this series-flow, pressure boosting two stage operation of the pumps. Again, it is to be understood that pumps 410 and 412 are each provided with a conventional one way back check valve which prevents reverse fuel flow through the respective pumps, but which in the case of either fuel pod assembly 36 or 36' enable operation of only one of the pumps 410 or 412 as desired for a single pump phase mode of computer programmed operation of the system.

Moreover, in certain applications requiring use of only one of the pumps 410, 412 either of the housings 400/402 or 400'/402' may be utilized as a common standardized port to house only a single pump. In such applications, housing 400/402 may be readily modified in manufacture by plugging passage 484 in lower housing 402 for installing only one of the pumps 410 or 412 in the pump cavity 432. In the case of housing 400'/402', no modification is required, and either one of the pumps 410 or 412 can be installed in either one of the pump cavities 430 or 432 of the housing.

If desired, the upper housing 400' of pod assembly 436' may be provided with a slightly modified connector boss 460' for receiving a conventional hermetic electrical connector fitting 514, similar to fitting 370 described previously.

Control System Functions and Electronics (SECU)

Figure 16:
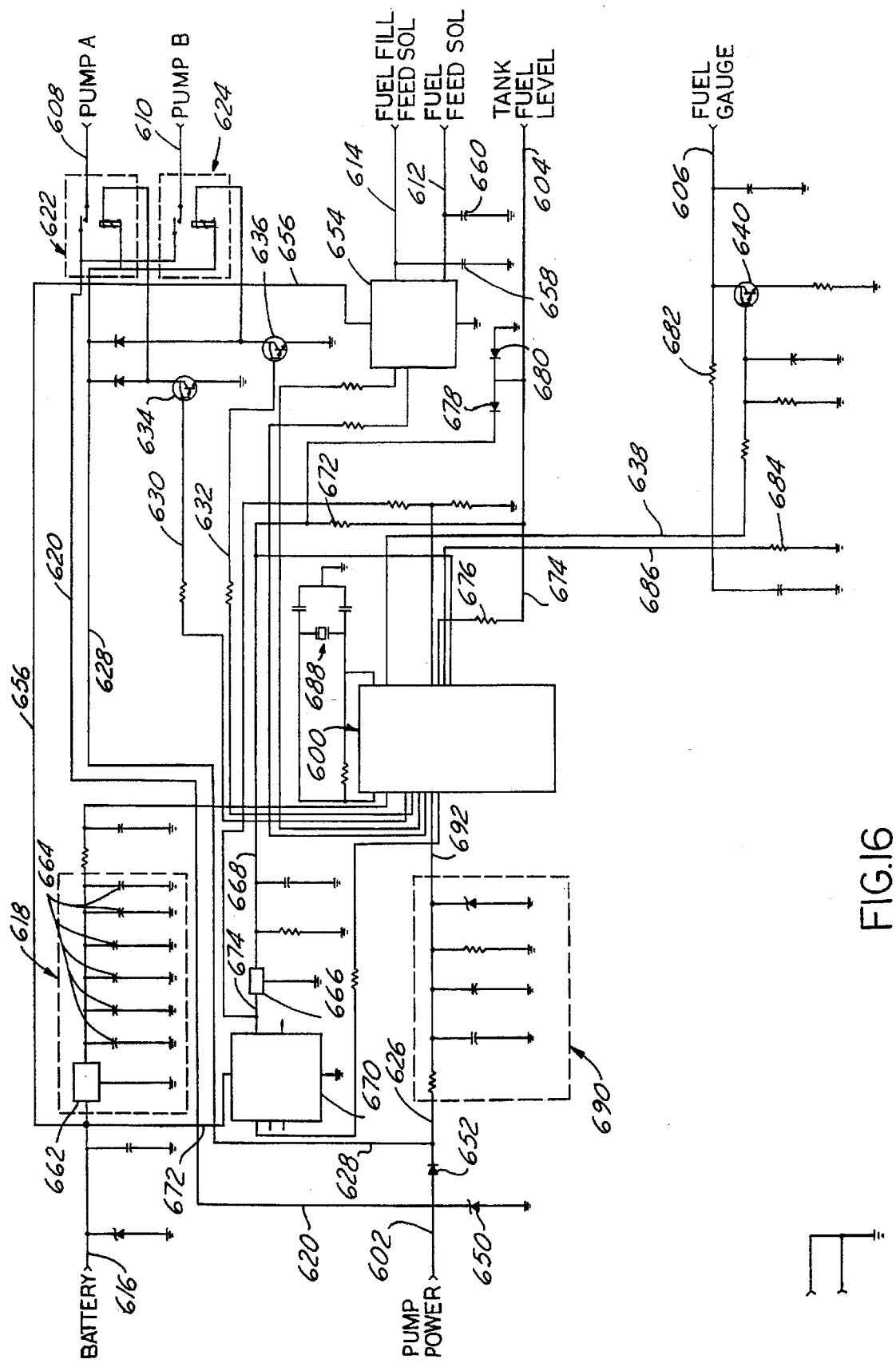
FIG. 16 is a schematic circuit diagram of the electronic control SECU subsystem of the automotive fuel system of FIGS. 1–14.
Figure 17:
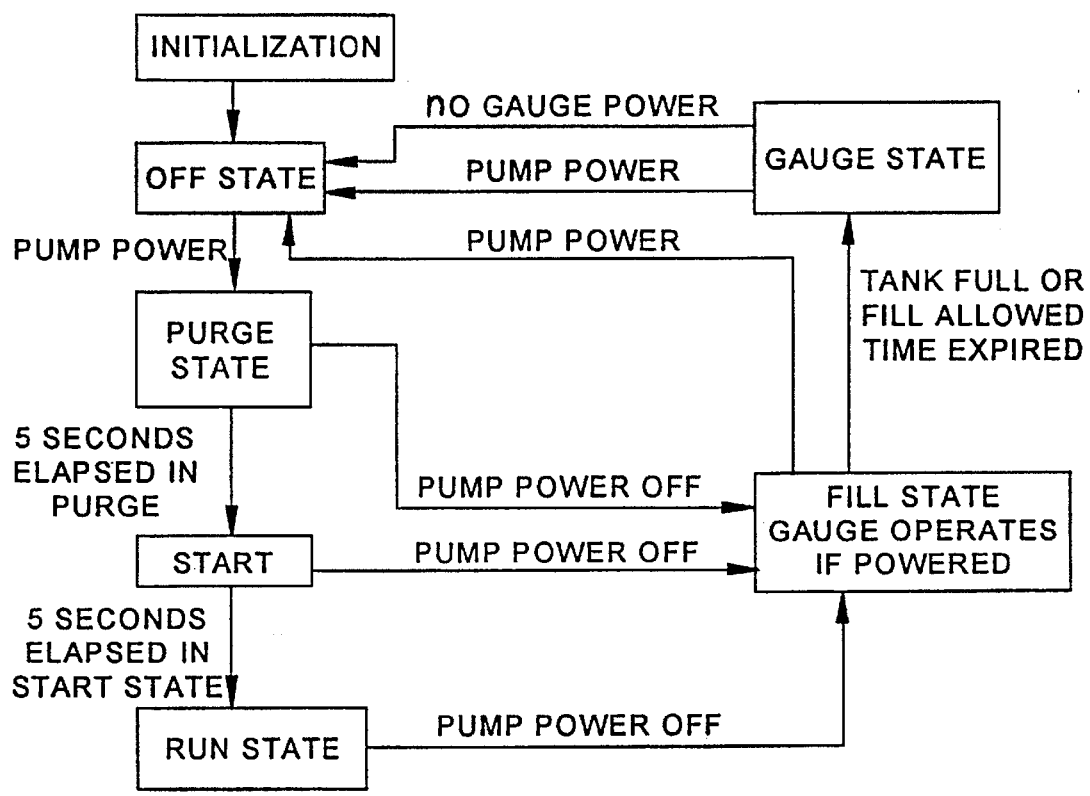
FIG. 17 is a function logic diagram of the SECU control system of FIG. 16.

The liquid propane tank system of the invention can now be better understood by reference to the system block diagram of FIG. 2 taken in conjunction with the simplified electronic control schematic circuit diagram of FIG. 16 and the system logic diagram of FIG. 17. The SECU electronic components and wiring of circuitry of FIG. 16 are preferably packaged on a circuit board and housed in a control box separate from fuel tank 34 and from system component module 30, and control the following functions:

(1) operation of one and/or two of the pumps 410 and 412 as required;

(2) engine fuel delivery operation of fuel supply valve 262 (solenoid 272);

(3) tank fill operation of the fuel fill valve 154 (solenoid 190);

(4) pre-start-up opening of the return check bypass valve 340 via purge operation of the fill valve 154 (solenoid 190 and valve body 210');

(5) stop-fill operation of valve 154 (solenoid 190 and valve bodies 210, 210') to stop filling of tank 34 at predetermined (e.g., 80%) full level as determined from signal from tank level sensor 418; and (6) operating vehicle fuel level gauge (not shown) on vehicle instrument panel (not shown) by calibrated output using input signal from fuel tank level sensor 418.

The requirements for the electronic control portion of the system are preferably established for use of the system on liquid propane powered vehicles. The system control electronics (SECU) thus provide operable control interface between the vehicle systems (EECU) and the liquid propane tank 34 in order to provide liquid propane to the liquid propane injection system (engine fuel injectors 70, 71) of the vehicle engine 72 in a manner which, as nearly as practical, provides vehicle engine behavior the same as a gasoline engine powered vehicle.

System Control Logic

The control logic for accomplishing the above objectives of the system of the invention, as performed by the (SECU) electronic control circuitry illustrated in FIG. 16 in cooperation with the vehicle EECU, in accordance with the method of the invention utilizing the system fluid handling components as described previously in conjunction with FIGS. 1-14, is illustrated in the logic diagram of FIG. 17, and may also be described as follows in conjunction with FIG. 17, as exemplified in one working embodiment of the invention:

A. Fuel Pumps 410–412—Both pumps shall operate for one minute following application of the pump power signal unless pump power signal is removed prior to the expiration of the one minute. One minute after pump power is applied one pump shall be turned off. The pump that remains on shall be the pump that was turned off the last time a single pump ran.

B. Fuel Supply Solenoid Valve 262—The feed solenoid 272 shall be powered as long as pump power signal is present.

C. Tank Fill Solenoid Valve 154—The fill solenoid 190 shall be powered when one of the following conditions exist.

C.1. Pump power is removed and the level sensor 418 resistance greater than 17 ohms. Solenoid 190 shall remain powered:
      a) until level sensor resistance is less than 17 ohms, or
      b) until 3 minutes elapse with no decrease in level sensor resistance, or
      c) after 3 minutes there is no decrease in resistance during any additional 30 second increment, or
      d) pump power is applied.
   C.2. Pump power is applied, fill solenoid 190 shall remain powered for 5 seconds.

D. The Vehicle Fuel Gauge (not shown) shall be driven any time any solenoid or pump is powered or gauge power is detected. Fuel Gauge drive shall be a pulse width modulated drive based on the fuel level sensor resistance.

E. The Fuel Level sensor 418 input interpretation shall default to full if level sensor resistance greater than 125 ohms.

SECU Control System Circuitry

FIG. 16 is a simplified schematic circuit diagram of an exemplary but preferred embodiment of electronic control circuitry for implementing the aforementioned control logic in operation of the system fluid handling components as organized in the functional relationship illustrated in the block diagram of FIG. 2. The heart of this control circuitry is a conventional microprocessor chip 600, such as that available from Motorola as microprocessor chip 68HC05P9, and adapted to run a conventional digitized computer software program constructed in accordance with the aforementioned control logic.

The system circuitry of FIG. 16 consists of three external inputs and five outputs. The three external inputs consist of:

(1) pump power supplied from a suitable 12 volt DC power source, such as the vehicle EECU, coupled to a power supply lead 602 and controlled by a vehicle signal supplying a pump-on request function, e.g., vehicle-operator command via the vehicle ignition switch;

(2) a tank fuel level analog signal coupled to lead 604 from the fuel level sensor 418 (float pivoted arm variable resistor potentiometer type), as for example a zero to 2.5 volts differential; and (3) a closed loop fuel gauge drive voltage signal supplied via a lead 606 as a vehicle originated signal of the pulse width modulated switch to ground type.

The five system circuitry outputs consists of:

(1) pump run power supply to "Pump A" supplied via a lead 608;

(2) pump run power supply to "Pump B" via lead 610;

(3) energizing power for the fuel supply (feed) valve solenoid 272 supplied via lead 612;

(4) energizing power for the fuel fill solenoid 192 supplied via lead 614; and (5) a dashboard gauge output drive power signal supplied via lead 606.

Circuit operational power is supplied by the conventional vehicle 12 volt battery coupled to battery power supply lead 616. An unswitched coupling is used between the battery and microprocessor 600, lead 616 being coupled through a DC regulating and filtering stage 618 to provide regulated 5 volts DC direct to microprocessor 600 to thereby provide power for operation of solenoids 190 and 272. The pump power lead 602 is connected by lead 620 to provide power from the vehicle engine on-board computer (EECU) for operation of the fuel pumps A and B (pumps 410 and 412 in module 36) as respectively switched on and off by associated relays 622 and 624. Pump power lead 602 is also coupled via a lead 626 to provide an input signal to processor 600 to request the pump-on function. A lead 628 supplies high side power for the control relay coils of relays 622 and 624 for pumps A and B.

Control of the pump relay coils is provided by control signals supplied by microprocessor 600 via leads 630 and 632 to semiconductor switches 634 and 636 respectively. The fuel tank level supply lead 604 is coupled to the ungrounded side of the resistor card in the fuel tank level sensor 418 to provide an analog voltage level signal at this point which is a function of the level of liquid propane fuel in tank 34 (e.g., resistance of sensor 418 decreases as liquid level rises).

The fuel gauge lead 606 supplies a signal from the vehicle fuel gauge and is driven by the associated circuitry and microcontroller chip 600 to position the fuel gauge readout on the vehicle just as though the fuel gauge lead 606 and level sensor lead 604 were directly connected to function in a normal vehicle system absent the intervening system of the invention. The fuel gauge is operated in a closed loop manner, i.e., the microcontroller 600 reads the gauge voltage and supplies control feedback current via lead 638 for semiconductor switch 640 to provide the desired gauge voltage.

Additional circuit components and their respective functions are as follows:

650—a Zener diode or varistor connected for circuit protection against voltage spikes;

652—a diode connected to prevent circuit operation of power supply leads inadvertently connected with improper reversed polarity;

654—solid state dual relay driver switch with fault detection diagnostic auxiliary components (operably coupled back to chip 600 via lead 655), for connecting solenoid power supplied via leads 616 and 656 to leads 612 and 614;

658 and 660—capacitors connected respectively to leads 614 and 612 and to ground for noise supression filtering;

662—five volt DC solid state voltage regulator;

664—distributed capacitors of stage 618 to suppress noise across the circuit board and to filter the DC input voltage;

666—voltage regulator for supplying five volts regulated DC power to level sensor via lead 668 and resistor 672 and the reference lead voltage for input to the A/D converter in chip 600 via lead 674 and resistor 676;

670—solid state switch for connecting power via leads 672 and 674 to level sensor regulator power supply 666 to thereby reduce off-state (dormant) power consumption, e.g., down to 2 milliamps;

672—fixed resistor connected to five volt supply via lead 668, and to grounded variable resistor card (e.g., 6–120 ohms, not shown) of lever sensor 418 via lead 604, and forming therewith a voltage divider network providing an A/D converter input analog fuel level voltage signal via lead 674 to chip 600;

676, 678 and 680—a resistor and two diodes operably connected in level sensor signal circuit stage for protection of chip 600 from spurious noise in level signal lead 604;

682, 684—resistors connected in series to fuel gauge lead 606 as voltage divider network in vehicle fuel gauge input signal stage;

686—lead supplying divider-reduced fuel gauge analog level variable voltage signal input to A/D converter in chip 600;

688—a solid state ceramic resonator which functions as a fixed frequency clock pulse source for chip 600;

690—voltage divider filter network for coupling primary control signal lead 626 to chip primary control input lead 692 to thereby detect pump state and thereby initiate chip software functions.

It is also to be understood that suitable chip power connections and pull-up resistors (not shown) are also provided in circuit in a conventional manner coupled to appropriate chip gate terminal pins to provide VCC chip power (equivalent to the output pin of 662) and to pull up (or down) gate voltages so that gate reference voltages are not floating noisily in operation of chip 600.

SECU Control Software

The SECU control system and circuitry is driven by a computer software program for microchip 600. This computer program is organized in accordance with the previously described control logic for operating the system components outlined in FIG. 2 and in accordance with the logic diagram of FIG. 17 as implemented by the control circuitry of FIG. 16. This program thus consists of six main state routines with three major subroutines. There are also several utility routines and three interrupt service routines. These routines, as organized for further and conventional development of suitable implementing software coding, are described below for the exemplary working embodiment disclosed herein:

Reset: Power up Starts here. Initializes variables and hardware

Main State Routines (1) Offstate: Program is waiting for an input—Pump and/or Fuel Gauge Voltage. All outputs are off.

(2) PurgeState: Pump power is on, both pumps on, feed and fill solenoids on. Fuel gauge on.

(3) StartState: Pump power is on. Two pumps are on. Feed solenoid on. Fuel gauge on.

(4) RunState: Pump power is on. One pump is on. Feed solenoid is on, gauge is on.

(5) FillState: Fill state is entered from either the StartState or RunState. FillState is exited to off state when the tank is "full", i.e., 80% of full tank volume. FillState fuel gauge is driven if it is powered, i.e., voltage is detected on A/D (analog to digital conversion) input from fuel gauge.

(6) GaugeState: Gauge is on, all other outputs are off. Gauge is driven as long as voltage is detected on gauge A/D (in chip).

Main Subroutines:

(1) Gauge: Drives fuel gauge for dashboard display with results of CalcGauge in StartState, RunState and FillStates.

(2) ReadLevel: A/D routine to read fuel level; thirty two results are kept for averaging.

(3) CalcGauge: Result of A/D average is held in thirty two byte buffer for second average. Result is used for dashboard gauge drive.

Utility Routines

CheckDeltaLevel: Is Fill Level increasing?

Interrupt Routines

DummyInt: Clear unexpected interrupts

Timeoverflow: Keep track of time extended time

OutputCompare: Gauge Drive PWM routine 980 Hz Repeat rate, when active (125 Hz major routine service)

Advantages

From the foregoing description and drawing figures referenced thereby and incorporated herein, it will now be seen that the system, method and apparatus of the invention amply fulfill the aforestated and other objects of the invention. The liquid propane tank system of the invention integrates all of the functions required of a propane fuel tank system into a single "bolt-on package" and offers many advantages including the following:

(1) Economical;
   reduced fuel tank manufacturing cost because the many prior welded joints are not required (2) Reduced potential leak paths;
   no weld joints
   can perform a system leak test before assembly of module 30 to tank 34 rather than prior leak testing of numerous individual components after assembly to tank
   flange/housing to tank seal via O-ring 144

(3) Easier fuel system service;—module 30 removed and installed as a single unit.

(4) Easier customer assembly;—(7) bolts to hold flanged mounting manifold 32 in place, not a variety of prior valves, etc. that must be threaded and sealed (5) In-Tank Fuel pump(s) 410, 412;
   provide for maintaining a liquid propane fuel supply to engine under varying operating conditions, in contrast to current commercially available gaseous propane fuel systems
   two-pump operation configurred to run in parallel to provide increased fuel flow for improved engine startability, particularly hot restart
   if desired, the two-pump operation can be configured to run in series to provide increased fuel pressure
   one-pump running during normal engine operation to improve pump life; i.e., the pumps 410 and 412 are run alternately each time the engine is restarted (6) Level Sensor 418;—off-the-shelf gasoline 'Automotive-proven' level sensor allows reliable, accurate monitoring of the fuel level in the tank 34

(7) Environmentally sound;—uses the standard (Walbro™) gasoline automotive level sensor 418 to provide an integral, electronically controlled stop-fill mechanism 154 that does not exhaust liquid or gaseous propane to the atmosphere, as compared to the prior and currently widely used commercially available "spit valve" type stop-fill indicator (8) Electronically controlled automatic fuel supply solenoid shut-off valve 262, rather than a prior manual, mechanical shut-off valve (9) Integrated design allows for 'crash test' integrity

(10) Large smooth internal passages 100, 102, 104, 106, 266 allow for maximum fuel flow

(11) Internal passage design 360, 106 optimizes the flow path to ensure proper evacuation of the fuel tank in a 'bonfire test'

(12) Use of off-the-shelf gasoline automotive fuel filter 414, 416 to provide clean fuel supply to fuel pump(s).

What is claimed is:

1. A liquid propane fuel storage and fuel delivery system for supplying liquid propane fuel to a vehicle-installed automotive internal combustion engine equipped with fuel injectors, a fuel rail communicating with the inlets of the injectors with the injectors being coupled in parallel between the rail and engine combustion chambers, and an on-board computerized electronic engine control unit (EECU), the engine being operable for developing driving power to the vehicle in response to vehicle-operator input control commands to the EECU, said system comprising:

(1) a fuel storage tank constructed to withstand interior pressures sufficient to maintain propane fuel in a liquid state in a tank interior chamber even at maximum ambient temperatures to be encountered in vehicle design operating conditions, (2) an engine fuel delivery conduit means operably coupled for communicating propane fuel between the tank interior chamber and the engine fuel injectors and including supply line means for delivering propane fuel from the tank interior chamber to the injectors via the fuel rail and return line means for returning excess fuel from the fuel rail to the tank interior chamber in bypass relation to injector output to the engine, (3) electric fuel pump means having inlet means disposed in the lowest elevation of the tank interior chamber and having outlet means operably coupled in series with said fuel delivery conduit means for pumping liquid propane from the tank interior chamber to said supply line means at a pressure above tank interior chamber pressure, (4) fuel handling means operably fluid flow intercoupled between said tank interior, said pump outlet means and said fuel delivery conduit means comprising:

(a) solenoid-operated fuel supply valve means operable for opening and closing communication between said pump outlet means and said supply line means, (b) fuel return check valve means operable for opening communication from said return line means to said tank interior chamber in response to return line fuel pressure exceeding tank interior chamber pressure by a given pressure differential amount, and for preventing reverse flow from the tank interior chamber into said return line means, and (c) fuel return check bypass valve means operable for communicating said return line means into the tank interior chamber in bypass flow relation to said fuel return check valve means in response to a tank in-flow direction pressure differential thereacross much less than said given pressure differential operational amount of said fuel return check valve means, and also being operable as a reverse flow check valve for preventing reverse flow from the tank interior chamber to said return line means, and (5) system electronic control means (SECU) operably electrically coupled in controlling relation to said fuel pump means, said fuel supply valve means, said bypass valve means and operably slave control coupled to said EECU for automatically:

(a) causing said pump means to be energized to deliver propane from the tank interior in a liquid state past the fuel injectors via the fuel rail and back to the tank interior chamber via said bypass valve means with a relatively high flow rate and relatively low pressure differential just prior to engine fuel delivery operation of said fuel injectors to thereby purge propane vapor from said supply and return line means and fuel rail, and (b) then closing said bypass valve means while said pump means is so energized to thereby cause said pump means to supply propane via said fuel supply valve means and said supply line means to said fuel injectors via the fuel rail in a liquid state concurrently with engine fuel delivery operation thereof and to return excess fuel flowing in the fuel rail past said fuel injectors to the tank interior chamber via said return line means and said fuel return check valve means at a return line pressure higher than tank interior chamber pressure by at least said given pressure differential amount.

2. The system as set forth in claim 1 wherein said fluid handling means further includes excess flow valve means having an inlet and an outlet coupled respectively in series flow relation to said pump outlet means and to said fuel supply valve means and normally allowing a fuel system flow rate of fuel therethrough in response to a small pressure differential existing between said inlet and outlet of said excess flow valve means, and also operable for severely limiting flow of propane from said outlet of said pump means to said supply line means via said fuel supply valve means in response to a sudden large increase in pressure differential therebetween caused by a delivery system failure event such as rupture type leakage of said fuel delivery conduit means.

3. The system as set forth in claim 2 wherein said fluid handling means further includes supply line pressure relief means operably coupled between said outlet of said excess flow valve means and said tank interior chamber for relieving pressure in said pump outlet means of said supply line means when the pressure differential between said fuel pump outlet means and the tank interior rises above a predetermined value to thereby prevent overstressing of said pump outlet means of said supply line means under all conditions of system operation and service.

4. The system as set forth in claim 1 wherein said fluid handling means further includes tank fuel level sensing means operably coupled to said SECU for providing a control signal for indicating the level of liquid propane in the tank interior chamber, tank fill passageway means operable for admitting liquid propane from a tank-external source of supply to the tank interior chamber, and solenoid operated fill valve means operably electrically coupled to said SECU for automatically opening and closing communication between said fill passageway means and the tank interior chamber in response to a tank level control signal from said tank level sensing means when said fuel pump means is in a de-energized state.

5. The system as set forth in claim 4 wherein said fill valve means is operably electrically coupled to said SECU for automatically closing said fill valve means when the level of liquid propane in said tank interior chamber reaches a predetermined value less than liquid full.

6. The system as set forth in claim 4 wherein said fill valve means includes supply and return line purge valve means for automatically opening and closing communication between the tank interior chamber and an outlet of said bypass valve means in response to a line purge command from said SECU.

7. The system of claim 6 wherein said fill valve means comprises two-stage valve means having a first stage valve means and a solenoid means directly mechanically coupled thereto for opening and closing said fill passageway means to control tank filling operation and also serving as said line purge valve means in response to command signals from said SECU, and having a second stage valve means disposed upstream in said fill passageway means from said first stage valve means and coupled thereto for lost motion by a spring means yieldably biasing apart said first and second stage valve means, said second stage valve means being operated between positions opening and closing said fill passageway means by hydrostatic pressure differential between the pressure in said fill passageway means upstream thereof and the tank interior chamber pressure to thereby permit tank filling via said first stage valve means when opened, and to serve as a hydrostatic back check valve in the non-tank fill mode of said system.

8. The system as set forth in claim 4 wherein said fuel level sensing means is operably electrically coupled via said SECU to a tank fuel gauge means of the vehicle for providing a fuel gauge readout signal indicating the level of liquid propane in said tank interior chamber, and wherein said gauge means is operably coupled to said SECU for determining that said gauge is operably powered by the vehicle ignition circuitry for tank-level-indicating operation of said gauge means while the same remains operably powered.

9. The system as set forth in claim 4 wherein said fluid handling means further includes excess flow valve means having an inlet and an outlet coupled respectively in series flow relation to said pump outlet means and to said fuel supply valve means and normally allowing a fuel system flow rate of fuel therethrough in response to a small pressure differential existing between said inlet and outlet of said excess flow valve means, and also operable for severely limiting flow of propane from said outlet of said pump means to said supply line means via said fuel supply valve means in response to a sudden large increase in pressure differential therebetween caused by a delivery system failure event such as rupture type leakage of said fuel delivery conduit means.

10. The system as set forth in claim 9 wherein said fluid handling means further includes supply line pressure relief means operably coupled between said outlet of said excess flow valve means and said tank interior chamber for relieving pressure in said pump outlet means of said supply line means when the pressure differential between said fuel pump outlet means and the tank interior rises above a predetermined value to thereby prevent overstressing of said pump outlet means of said supply line means under all conditions of system operation and service.

11. The system as set forth in claim 10 wherein said fill valve means includes supply and return line purge valve means for automatically opening and closing communication between the tank interior chamber and an outlet of said bypass valve means in response to a line purge command from said SECU.

12. The system as set forth in claim 11 wherein said fill valve means comprises two-stage valve means having a first stage valve means and a solenoid means directly mechanically coupled thereto for opening and closing said fill passageway means to control tank filling operation and also serving as said line purge valve means in response to command signals from said SECU, and having a second stage valve means disposed upstream in said fill passageway means from said first stage valve means and coupled thereto for lost motion by a spring means yieldably biasing apart said first and second stage valve means, said second stage valve means being operated between positions opening and closing said fill passageway means by hydrostatic pressure differential between the pressure in said fill passageway means upstream thereof and the tank interior chamber pressure to thereby permit tank filling via said first stage valve means when opened, and to serve as a hydrostatic back check valve in the non-tank fill mode of said system.

13. The system as set forth in claim 12 wherein said fill valve means is operably electrically coupled to said SECU for automatically closing said fill valve means when the level of liquid propane in said tank interior chamber reaches a predetermined value less than liquid full.

14. The system as set forth in claim 13 wherein said fuel level sensing means is operably electrically coupled via said SECU and said EECU to a tank fuel gauge means of the vehicle for providing a fuel gauge read-out signal indicating the level of liquid propane in said tank interior chamber.

15. The system as set forth in claim 4 wherein said tank has a mounting platform constructed and arranged on a top wall of said tank and having an exterior access opening extending downwardly and opening into the tank interior chamber, and said fluid handling means comprises a system mounting manifold member means having a valve body with a peripheral flange removably secured by fastening means to an exterior surface of said platform surrounding the access opening, said member means having exterior coupling port means, interior coupling passageway means and associated component mounting means constructed and arranged for operably mounting and mechanically interconnecting in operable fluid handling system relationship said fluid handling means of clauses 4(a), 4(b), and 4(c) of claim 1 as well as said tank fill passageway means and fill valve means of clause 4 of claim 1, said system means of clauses 1, 2, 3 and 5 of claim 1 also being operably system interface coupled via said mounting manifold member means with said fluid handling means to thereby provide such mounting and system operating interconnections in a single integrated module mountable and demountable on said tank platform with all of such fluid handling means disposed within and/or below said mounting manifold member means and exposed to and/or in operable communication with the tank interior chamber.

16. The system as set forth in claim 15 wherein said fluid handling means integrated into said mounting manifold means further includes excess flow valve means having an inlet and an outlet coupled respectively in series flow relation to said pump outlet means and to said fuel supply valve means and normally allowing a fuel system flow rate of fuel therethrough in response to a small pressure differential existing between said inlet and outlet of said excess flow valve means, and also operable for severely limiting flow of propane from said outlet of said pump means to said supply line means via said fuel supply valve means in response to a sudden large increase in pressure differential therebetween caused by a delivery system failure event such as rupture type leakage of said fuel delivery conduit means.

17. The system as set forth in claim 16 wherein said fluid handling means integrated into said mounting manifold means further includes supply line pressure relief means operably coupled between said outlet of said excess flow valve means and said tank interior chamber for relieving pressure in said pump outlet means of said supply line means when the pressure differential between said fuel pump outlet means and the tank interior rises above a predetermined value to thereby prevent overstressing of said pump outlet means of said supply line means under all conditions of system operation and service.

18. The system as set forth in claim 17 wherein said fill valve means in said mounting manifold member means includes supply and return line purge valve means for automatically opening and closing communication between the tank interior chamber and an outlet of said bypass valve means in response to a line purge command from said SECU.

19. The system of claim 18 wherein said fill valve means comprises two-stage valve means having a first stage valve means and a solenoid means directly mechanically coupled thereto for opening and closing said fill passageway means to control tank filling operation and also serving as said line purge valve means in response to command signals from said electronic control system, and having a second stage valve means disposed upstream in said fill passageway means from said first stage valve means and coupled thereto for lost motion by a spring means yieldably biasing apart said first and second stage valve means, said second stage valve means being operated between positions opening and closing said fill passageway means by hydrostatic pressure differential between the pressure in said fill passageway means upstream thereof and the tank interior chamber pressure to thereby permit tank filling via said first stage valve means when opened, and to serve as a hydrostatic back check valve in the non-tank fill mode of said system.

20. The system as set forth in claim 19 wherein said mounting manifold member means further includes support means for operably suspending said fuel pump means therefrom with said pump inlet means disposed adjacent the lowest level of the tank interior chamber.

21. The system as set forth in claim 19 wherein said exterior coupling port means of said mounting manifold member means comprises a fuel supply port means and a fuel return port means for respectively removably coupling tank-external runs of said supply and return line means thereto, and further comprises a fill port means communicating with said fill passageway means and adapted for removably coupling to an outlet nozzle of a fuel hose connected to the fuel supply source.

22. The system as set forth in claim 21 wherein said manifold mounting member means further includes pressure relief valve means and associated pressure relief passageway means for operably connecting the tank interior chamber with the tank exterior when tank interior pressure exceeds a predetermined value, said exterior coupling port means including a relief port means communicating with an outlet of said relief passageway means downstream of said pressure relief valve means and adapted for removably coupling an exterior relief conduit means thereto.

23. The system as set forth in claim 22 wherein said exterior coupling port means comprise four individual ports individually associated one each with said fuel supply, said fuel return, said fill and said relief port means, said four ports opening outwardly of said manifold mounting member means above the tank top wall, said four ports being arranged in a row in a side face of said body flange of said member means and being oriented with their axes generally parallel to one another.

24. The system as set forth in claim 23 wherein said mounting manifold member means further includes drain valve means and associated drain passageway means for operably connecting the tank interior chamber with the tank exterior when said drain valve is opened, said member means having a tank-exterior top face, and drain valve port means communicating with an outlet of said drain valve and passageway means and being disposed in said top face and oriented with its axis generally perpendicular to said four port axes.

25. The system as set forth in claim 24 wherein said mounting manifold member means further includes a hermetically sealed electrical pass-through connector and associated electrical lead passageway for coupling external power and control lead connections from said SECU to said fuel pump means, to a solenoid of each of said solenoid operated fuel supply and fill valve means and to said level sensing means from within the tank interior chamber.

26. The system as set forth in claim 20 wherein said fuel pump means comprises a pump housing having first and second of side-by-side pump receiving interior cavities each adapted to individually receive upright therein an electrically driven liquid fuel pump oriented with its inlet facing the bottom of the cavity, said housing having a single inlet communicating the tank interior chamber with the bottom of said first cavity and adapted to admit liquid fuel to the inlet of a pump disposed in said first cavity, said housing having a main outlet passageway means at its upper end.

27. The system as set forth in claim 26 wherein said connecting passageway means connects said first mounting passageway directly only with the bottom of said second cavity and said main outlet passage is connected directly only with said second mounting passageway.

28. The system as set forth in claim 27 further including a second electric fuel pump operably mounted in said second cavity and operable as a second stage pressure boosting pump relative to said first pump in serial downstream flow therewith.

29. The system as set forth in claim 26 wherein said connecting passageway means of said housing comprises a first cross passage interconnecting the bottom of said cavities with said housing single inlet, and a second cross passage interconnecting said mounting passageways with said housing main outlet, and further including a second electric fuel pump operably mounted in said second cavity and operable when energized to pump in parallel flow relation with said first pump for boosting the volumetric flow rate to said main housing outlet from said housing single inlet.

30. The system as set forth in claim 29 wherein said SECU is capable of selectively energizing either one or both of said pumps in accordance with a control command from a system computer program of said SECU.

31. The system as set forth in claim 30 wherein said SECU is operable under the control of said system program to automatically energize only one of said pumps in an alternating sequence with the other of said pumps each time said SECU is reset to initially pump fuel to said fuel injectors.

32. The system as set forth in claim 26 wherein said housing connecting passageway means comprises a first passage connecting said housing single inlet only with the bottom of said first cavity, a second passageway connecting said first cavity mounting outlet passageway only with the bottom of said second cavity, and a third passage connecting said second cavity mounting outlet passageway only with said main housing outlet, and further including a second electric fuel pump operably mounted in said second cavity and operable when energized in serial flow relation with said first pump for boosting the output pressure of liquid propane received via said second connecting passageway from the output of said first pump as delivered to said main housing outlet.

33. A method of storing liquid propane fuel on a vehicle and supplying liquid propane fuel to an automotive internal combustion engine of the vehicle equipped with fuel injectors and an on-board computerized electronic engine control unit (EECU), the engine being operable for developing driving power to the vehicle in response to vehicle-operator input control commands, said method comprising the steps of:

(1) providing a fuel storage tank constructed to withstand interior pressures sufficient to maintain propane fuel in a liquid state in a tank interior chamber at least up to normal elevated ambient vehicle operational temperatures, (2) communicating liquid propane fuel via conduit means between the tank interior and the engine fuel injectors during engine operation by delivering fuel from the tank interior chamber to the injectors and returning excess fuel from the injectors to the tank interior chamber via the conduit means in bypass relation to injector output to the engine, (3) causing fuel pressure at the input to the fuel injectors to exceed tank interior chamber pressure by a given pressure differential amount in the conduit means, (4) just prior to engine start-up causing delivery of propane from the tank interior chamber in a liquid state past the fuel injectors and back to the tank interior chamber via the conduit means with a relatively high flow rate by proportionately reducing the pressure differential amount in the conduit means just prior to engine fuel delivery output operation of said fuel injectors to thereby purge propane vapor from the conduit means at the input to the injectors, and (5) then starting the engine while continuing to pump propane to the fuel injectors via the conduit means in a liquid state concurrently with engine fuel delivery operation thereof by again causing fuel delivery pressure at the input to the injectors to exceed tank interior chamber pressure by at least said given pressure differential amount in the conduit means.

34. The method as set forth in claim 33 including the further step of limiting excess pumped fuel flow from the tank interior chamber toward the input to the injectors above a normal fuel system flow rate of fuel via the conduit means by severely limiting flow of pumped propane fuel in response to a sudden large increase in pressure differential between pumping delivery pressure and tank interior pressure caused by a failure event such as rupture-type leakage to ambient in the delivery of fuel to and/or in bypass from the input to the injectors via the conduit means.

35. The method as set forth in claim 34 including the further step of relieving pressure in the pumped fuel delivery supply to the conduit means when the pressure differential between pumped fuel delivery pressure and the tank interior chamber rises above a predetermined value to thereby prevent overstressing of the fuel delivery conduit means under all conditions of system operation and service.

36. The method as set forth in claim 33 further including the further steps of providing tank fill passageway means for admitting liquid propane from a tank-external source of supply to the tank interior chamber, and automatically opening communication between the supply source and tank interior chamber via the tank fill passageway means only when the level of liquid propane in the tank interior chamber is below a predetermined upper level limit.

37. The method as set forth in claim 36 including the further step, during tank filling from the supply source via the tank fill passageway means, of automatically closing the fill passageway means when the level of liquid propane in said tank interior chamber reaches the predetermined upper limit to thereby retain a vapor dome above the liquid propane in the tank interior chamber.

38. The method as set forth in claim 36 including the step of purging vapor from the conduit means is performed by automatically opening and closing communication between the tank interior chamber and the conduit means downstream of the injectors via the fill passageway means.

39. The method as set forth in claim 38 wherein a two-stage fill valve means is provided having first stage valve means operable for opening and closing the fill passageway means to control the tank filling operation and also serving as a conduit means purge valve, and having second stage valve means disposed upstream in the fill passageway means from the first stage valve means, said second stage valve means being operable between positions opening and closing the fill passageway means by hydrostatic pressure differential between the pressure in the fill passageway means upstream thereof and the tank interior chamber pressure to thereby permit tank filling via the second and first stage valve means, said second stage valve means being operable as a hydrostatic back check valve when not filling the tank.

40. The method as set forth in claim 37 comprising the step of providing fill valve means operably electrically coupled to the ECU and to a tank fuel gauge system of the vehicle for automatically closing the fill passageway means when the level of liquid propane in the tank interior chamber reaches a predetermined value less than liquid full.

41. A liquid propane fuel storage and fuel delivery system for supplying liquid propane fuel to a vehicle-installed automotive internal combustion engine equipped with fuel injectors and an on-board computerized electronic engine control unit (EECU), the engine being operable for developing driving power to the vehicle in response to vehicle-operator input control commands, said system comprising:

(1) a fuel storage tank constructed to withstand interior pressures sufficient to maintain propane fuel in a liquid state in a tank interior chamber even at elevated ambient temperatures sufficient to generate a propane vapor pressure in the tank interior chamber of at least about 312 psig, said tank containing a tank level sensor operable to provide an electrical signal indicating the level of liquid propane in the tank interior chamber, (2) an engine fuel delivery conduit operably coupled for communicating propane fuel between the tank interior chamber and the engine fuel injectors and including a supply line for delivering propane fuel from the tank interior chamber to the injectors and a return line for returning excess fuel from the injectors to the tank interior chamber in bypass relation to injector output to the engine, (3) a pair of first and second electric fuel pumps having a common pump inlet conduit disposed in the lowest elevation of the tank interior chamber and having a common pump outlet operably coupled in series with said fuel delivery conduit for pumping liquid propane from the tank interior chamber to said supply line at a pressure above tank interior chamber pressure, (4) a fuel handling component and passageway module removably mounted on a top wall of said tank and containing the following components and associated passageways intercoupled between said tank interior chamber, said common pump outlet and said fuel delivery conduit,
  - (a) a solenoid-operated fuel supply valve for opening and closing communication between said common pump outlet and said supply line,
  - (b) a fuel return check valve for opening communication from said return line to said tank interior chamber in response to return line fuel pressure exceeding tank interior chamber pressure by a given pressure differential amount, and preventing reverse flow from the tank interior chamber into said return line,
  - (c) a bypass valve for bypassing fuel from said return line past said fuel return check valve into the tank interior chamber in response to a flow direction pressure differential thereacross much less than said given pressure differential amount and also being operable as a reverse flow check valve for preventing reverse flow from the tank interior chamber to said return line,
  - (d) a tank fill passageway for admitting liquid propane from a tank-external source of supply to the tank interior chamber, and an associated solenoid-operated two-stage tank fuel fill valve having a primary stage solenoid operated valve member for automatically opening and closing said fill passageway in response to a tank level control signal, and a second stage valve member operable upstream of said primary valve member as a hydrostatic back check valve for closing communication between the tank interior chamber and said fill passageway when said primary stage valve member is operated in a non-tank filling phase of system operation, and (5) system electronic control means (SECU) operably electrically coupled in controlling relation to said pumps, said fuel supply valve, said bypass valve, said fill valve and operably slave coupled to control said EECU and for automatically causing:
  - (a) operation of one and/or two of said pumps as required to deliver liquid propane from the tank interior chamber to the common pump outlet,
  - (b) engine fuel delivery operation of said fuel supply valve to deliver liquid propane pumped from said common pump outlet to said fuel delivery conduit supply and return lines,
  - (c) tank fill opening and closing operation of the fuel fill valve,
  - (d) pre-engine-start-up opening and closing of the return check bypass valve via purge operation opening and closing of the primary stage valve member of said fill valve, and
  - (e) closing operation of said fill valve to stop filling of said tank at approximately the 80% liquid full level as determined from the tank level control signal from said tank level sensor.

42. The system as set forth in claim 41 wherein said fuel level sensing means is operably electrically coupled via said SECU and said EECU to a tank fuel gauge of the vehicle for visably indicating on said gauge the level of liquid propane in said tank interior chamber by utilizing the tank level control signal from said tank level sensor.

43. The system as set forth in claim 42 wherein said fluid handling module further includes an excess flow valve having an inlet and an outlet coupled respectively in series flow relation to said common pump outlet and to said fuel supply valve and normally allowing a fuel system flow rate of fuel therethrough in response to a small pressure differential existing between said inlet and outlet of said excess flow valve means, and operable for severely limiting flow of propane from said common pump outlet to said supply line via said fuel supply valve in response to a sudden large increase in pressure differential therebetween caused by a delivery conduit failure event such as rupture-type leakage of said fuel delivery conduit.

44. The system as set forth in claim 43 wherein said fluid handling module further includes a supply line pressure relief valve operably coupled between said outlet of said excess flow valve and said tank interior chamber for relieving pressure in common pump outlet when the pressure differential between said fuel pump common outlet and the tank interior exceeds a predetermined value sufficient to prevent overstressing of a fuel line hose coupled between said common pump outlet and said fuel supply valve under all conditions of system operation and service.

45. The system as set forth in claim 42 wherein said fuel pumps are intercoupled between said common pump inlet and outlet to pump in parallel flow relation and said SECU includes a microprocessor and associated electrical circuitry operable in conjunction with said vehicle EECU for utilizing said system fluid handling components as programmed to operate in accordance with the following system operational logic:
  - A. Both of said pumps shall operate for a short time period following application of a pump power signal unless pump power signal is removed prior to the expiration of such short time period; after such short time period has elapsed for dual pump power to be applied, one pump shall be turned off; the pump that remains on shall be the pump that was turned off the last time a single pump ran;
  - B. Said fuel supply valve solenoid shall be powered to hold in open condition as long as pump power signal is present;
  - C. Said tank fill valve solenoid shall be powered to hold said primary stage valve member open when one of the following conditions exist:
    - C.1. Pump power is removed and level sensor signal corresponds to less than about 80% tank liquid full signal; fill valve solenoid then shall remain powered;
      - a) until level sensor signal reaches approximately such 80% liquid full value from a tank less full value, or
      - b) until a given few minute period has elapsed with no change in level sensor signal; or
      - c) after such few minute period there is no increase toward full in level sensor signal value during any additional and much shorter time increment, or
      - d) pump power is applied;
    - C.2. Pump power is applied, fill solenoid shall remain powered for a period of several seconds for opening of said bypass valve;
  - D. Said vehicle fuel gauge shall be driven any time any of said fill or supply value solenoids or said pumps is powered or gauge power is detected; fuel gauge drive shall be a pulse width modulated drive based on the fuel level sensor signal value, and
  - E. The fuel level sensor input interpretation shall default to full if sensor signal exceeds value corresponding to beyond tank empty signal value limit.

46. The system as set forth in claim 45 wherein said microprocessor software is programmed as follows including six main state routines and three major subroutines:
  Reset: Power up Starts here, Initializes variables and hardware;

Main State Routines
- (1) Offstate: Program is waiting for an input—Pump and/or Fuel Gauge Voltage; All outputs are off;
- (2) PurgeState: Pump power is on, both pumps on, feed and fill solenoids on; fuel gauge on;
- (3) StartState: Pump power is on; two pumps are on; feed solenoid on; fuel gauge on;
- (4) RunState: Pump power is on; one pump is on; feed solenoid is on; gauge is on;
- (5) FillState: Fill state is entered from either the StartState or RunState; FillState is exited to off state when the tank is "full", e.g., 80% of full tank volume; FillState fuel gauge is driven if it is powered, i.e., voltage is detected on A/D (analog to digital conversion) input from fuel gauge;
- (6) GaugeState: Gauge is on, all other outputs are off; gauge is driven as long as voltage is detected on gauge A/D (in microprocessor);

Main Subroutines:
- (1) Gauge: Drives fuel gauge for dashboard display with results of a CalcGauge in StartState, RunState and FillStates;
- (2) ReadLevel: AD routine to read fuel level, a given number of results are kept for averaging;
- (3) CalcGauge: Result of AD average is held in said given number capacity byte buffer for second average; result is used for dashboard gauge drive;

Utility Routines
CheckDeltaLevel: Is Fill Level increasing?;

Interrupt Routines
DummyInt: Clear unexpected interrupts;
Timeoverflow: Keep track of time extended time;
OutputCompare: Gauge Drive PWM routine at given Hz Repeat rate, when active (much less Hz major routine service).

47. A method of storing pressurized fluid fuel and supplying such fuel to apparatus adapted to consume such fuel by combustion thereof in use, said method comprising the steps of:
- (1) providing a fuel storage tank constructed to withstand interior pressures sufficient to maintain such fuel liquid in a tank interior chamber at least up to normal elevated ambient operational temperatures of such apparatus,
- (2) communicating such fuel via conduit means between the tank interior and the fuel consuming apparatus during operation thereof by delivering fuel from the tank interior chamber to the apparatus and returning excess fuel from the apparatus input to the tank interior chamber via the conduit means in bypass relation to the apparatus,
- (3) causing fuel pressure at the input to the fuel consuming apparatus to exceed tank interior chamber pressure by a given pressure differential amount in the conduit means,
- (4) just prior to apparatus start-up causing delivery of fuel from the tank interior chamber in a liquid state past the apparatus fuel input and back to the tank interior chamber via the conduit means with a relatively high flow rate by proportionately reducing the pressure differential amount in the conduit means just prior to apparatus start-up to thereby purge the conduit means at the input to the apparatus, and
- (5) then starting fuel combustion in the apparatus while continuing to pump fuel via the conduit means concurrently with apparatus fuel consuming operation by again causing fuel delivery pressure at the input to apparatus to exceed tank interior chamber pressure by at least said given pressure differential amount in the conduit means.

48. The method as set forth in claim 47 further including the further steps of providing tank fill passageway means for such fuel from a tank-external source of supply to the tank interior chamber, and automatically opening communication between the supply source and tank interior chamber via the tank fill passageway means only when the amount of liquid fuel in the tank interior chamber is below a predetermined upper limit.

49. The method as set forth in claim 48 including the further step, during tank filling from the supply source via the tank fill passageway means, of automatically closing the fill passageway means when the amount of fuel in said tank interior chamber reaches the predetermined upper limit to thereby prevent overfilling of the tank.

50. The method as set forth in claim 49 wherein the step of purging the conduit means is performed by automatically opening and closing communication between the tank interior chamber and the conduit means downstream of the apparatus fuel input via the fill passageway means.

51. The method as set forth in claim 50 wherein a two-stage fill valve means is provided having first stage valve means operable for opening and closing the fill passageway means to control the tank filling operation and also serving as a conduit means purge valve, and having second stage valve means disposed upstream in the fill passageway means from the first stage valve means, said second stage valve means being operable between positions opening and closing the fill passageway means by hydrostatic pressure differential between the pressure in the fill passageway means upstream thereof and the tank interior chamber pressure to thereby permit tank filling via the second and first stage valve means, said second stage valve means being operable as a hydrostatic back check valve when not filling the tank.

* * * * *